US012790119B2

(12) United States Patent
Zizka et al.

(10) Patent No.: US 12,790,119 B2
(45) Date of Patent: Nov. 10, 2026

(54) SYSTEMS, APPARATUSES, AND METHODS FOR WAREHOUSE OPERATION AND AUTOMATIC ORDER FULFILLMENT

(71) Applicant: Brightpick s. r. o., Bratislava (SK)

(72) Inventors: Jan Zizka, Ziar nad Hronom (SK); Tomas Kovacovsky, Bratislava (SK); Michal Maly, Bratislava (SK)

(73) Assignee: Brightpick s. r. o., Bratislava (SK)

( * ) Notice: Subject to any disclaimer, the term of this patent is extended or adjusted under 35 U.S.C. 154(b) by 350 days.

(21) Appl. No.: 18/591,223

(22) Filed: Feb. 29, 2024

(65) Prior Publication Data

US 2024/0199333 A1 Jun. 20, 2024

Related U.S. Application Data

(63) Continuation of application No. PCT/IB2022/058088, filed on Aug. 29, 2022.

(Continued)

(51) Int. Cl.
*B65G 1/137* (2006.01)
*B25J 9/16* (2006.01)
(Continued)

(52) U.S. Cl.
CPC .......... *B65G 1/1373* (2013.01); *B25J 9/1666* (2013.01); *B25J 9/1669* (2013.01); *B25J 15/065* (2013.01);
(Continued)

(58) Field of Classification Search
CPC ............ B65G 1/1373; B65G 2203/041; B65G 47/917; B65G 47/915; B65G 1/1378;
(Continued)

(56) References Cited

U.S. PATENT DOCUMENTS 9,327,397 B1 * 5/2016 Williams ................... B25J 3/04
9,550,624 B2 * 1/2017 Khodl .................... G06Q 50/40
(Continued)

FOREIGN PATENT DOCUMENTS

WO WO-2018146687 A1 * 8/2018 ............ B25J 9/0084
WO 2020216312 A1 10/2020

OTHER PUBLICATIONS

Cao et al., "A novel cellular neural network and its applications in motion planning." Advances in Neural Network Research and Applications. Springer, Berlin, Heidelberg, 2010. 265-273.
(Continued)

*Primary Examiner* — Michael Collins
(74) *Attorney, Agent, or Firm* — Smith Baluch LLP

(57) ABSTRACT

A method for fulfillment of an order includes receiving, at a master server, a specification of the order including a set of items. The master server selects a runner apparatus and transmits a first command to that apparatus to retrieve a first box for presentation to a picker apparatus, where the first box has an item for fulfillment of the order. The runner apparatus retrieves the first box and presents it to the picker apparatus by moving near the picker apparatus, where the picker apparatus includes a base portion that is immovable, and holding the box for access by the picker apparatus. The master server instructs the picker apparatus to sort that item from the first box to a destination box. The picker apparatus picks the item out of the box via a robot arm of the picker apparatus, and moves it to the destination box.

20 Claims, 19 Drawing Sheets

Related U.S. Application Data

(60) Provisional application No. 63/238,470, filed on Aug. 30, 2021.

(51) Int. Cl.

| | |
|---|---|
| ***B25J 15/06*** | (2006.01) |
| ***G05D 1/246*** | (2024.01) |
| ***G05D 1/646*** | (2024.01) |
| ***G05D 1/69*** | (2024.01) |
| ***G05D 105/20*** | (2024.01) |
| ***G05D 107/70*** | (2024.01) |
| ***G06V 10/82*** | (2022.01) |

(52) U.S. Cl.
CPC ............. *G05D 1/246* (2024.01); *G05D 1/646* (2024.01); *G05D 1/69* (2024.01); *G06V 10/82* (2022.01); *B65G 2203/041* (2013.01); *G05D 2105/20* (2024.01); *G05D 2107/70* (2024.01)

(58) Field of Classification Search
CPC ...... B25J 9/1666; B25J 9/1669; B25J 15/065; G05D 1/246; G05D 1/646; G05D 1/69; G05D 2105/20; G05D 2107/70; G06V 10/82; B66F 9/063
See application file for complete search history.

(56) References Cited

U.S. PATENT DOCUMENTS

| | | | | |
|---|---|---|---|---|
| 12,589,505 | B2 * | 3/2026 | Jin Kim | B25J 11/008 |
| 2017/0334644 | A1 * | 11/2017 | Otto | B65G 1/0492 |
| 2020/0202285 | A1 * | 6/2020 | Elazary | G05D 1/0287 |
| 2021/0078170 | A1 | 3/2021 | Jiang et al. | |

OTHER PUBLICATIONS

International Search Report and Written Opinion in International Application No. PCT/IB2022/058088 mailed Feb. 28, 2023, 20 pages.
Invitation to Pay Additional Search Fees in International Application No. PCT/IB2022/058088 dated Jan. 4, 2023, 10 pages.

* cited by examiner

SYSTEMS, APPARATUSES, AND METHODS FOR WAREHOUSE OPERATION AND AUTOMATIC ORDER FULFILLMENT

CROSS-REFERENCE TO RELATED APPLICATION

This application is a bypass continuation of International Application No. PCT/M2022/058088, titled "SYSTEMS, APPARATUSES, AND METHODS FOR WAREHOUSE OPERATION AND AUTOMATIC ORDER FULFILLMENT", filed on Aug. 29, 2022, which in turn claims the priority benefit, under 35 U.S.C. § 119(e), of U.S. Application No. 63/238,470 titled "SYSTEMS, APPARATUSES, AND METHODS FOR WAREHOUSE OPERATION AND AUTOMATIC ORDER FULFILLMENT", filed Aug. 30, 2021. Each of these applications is incorporated herein by reference in its entirety for all purposes.

BACKGROUND

Many conventional e-shops and warehouses employ human operators who pick the items from the warehouse, consolidate the items, and prepare the complete order according to the customer order. The customer order is usually managed by a software system, order management system. Sometimes, the human operators use wearable electronic devices, static displays, light indicators, to help them to properly pick the exact number of items or to know the exact location of the items. However, generally, the picking of items is manual.

Sometimes, warehouses use automated storage and retrieval systems which load items (usually in a box) from storage locations. The human operator may then pick the requested number of items from the box; the box is then sent back to storage. The ASRS are usually expensive and require a significant amount of space.

Many times, conveyors are used to transport items or boxes around the warehouse. The conveyors are usually expensive and require a significant amount of space.

Changing the layout of the warehouse, such as adding shelves might impose a significant amount of work necessary to install new conveyors. Installing a new ASRS requires significant investment and effort; it might require installation of new conveyors as well.

Picking stations, where human operators pick or manipulate the items are sometimes used. Changing the number of picking stations, or changing the order how the items/boxes are processed usually requires change in the conveyor lines network (layout and routing).

In some cases a vehicle might be used to assist human operators to carry the items or to speed up their movement across the warehouse; this usually requires investment into the vehicles, and a proper safety and operation training for the employees.

Many times, the warehouse is built in an area where the land price is high. For those (but not only for those) warehouses it is of great importance to operate on a smaller footprint. This is reflected by the need to have a high "density" of stored items per shelf area; and also the need that the other devices, equipment and rooms have smaller footprint, i.e. generally said, to operate with efficient use of the space.

The wages and other compensations of the employees might be a considerable part of the operating costs of the warehouse. On the other hand, the number of orders fulfilled, or the number items manipulated is somewhat proportional to the profitability of the warehouse. There is a need to have a high efficiency in the frequency of picked items per time.

SUMMARY

In some aspects, a method for fulfillment of an order including a set of items disposed in a set of boxes, with the boxes being disposed on a set of shelves, includes receiving, at a master server, a specification of the order including the set of items. The method further includes generating, at the master server, a set of commands for fulfillment of the order. The method further includes, for each item of the set of items, selecting a runner apparatus of a set of runner apparatuses as a first runner apparatus, and transmitting, by the master server to the first runner apparatus, a first command to retrieve a first box of the set of boxes for presentation to a picker apparatus, the first box having disposed therein a set of identical instances of that item. The method also includes retrieving, by the first runner apparatus and subject to the first command, the first box by moving to a location proximate to the first box and, via a lift of the first runner apparatus, moving a platform of the first runner apparatus to the same height as the first box. The method also includes drawing the first box off its associated shelf of the set of shelves and onto the platform. The method further includes presenting, by the first runner apparatus, the first box to the picker apparatus by moving to a location proximate to the picker apparatus, wherein the picker apparatus includes a base portion that is immovable, and via the lift, moving the platform holding the first box to a predetermined height for access by the picker apparatus. The method also includes transmitting, by the master server the picker apparatus, a second command to sort that item from the first box to a destination box. The method further includes picking, by the picker apparatus and subject to the second command, that item by imaging at least a portion of an interior of the first box to identify and select an instance of that item from the set of items as a selected item. The method also includes identifying a pick point of the selected item and via a robot arm of the picker apparatus, engaging with the identified pick point of the selected item to pick the selected item out of the first box. The method further includes moving, by the picker apparatus, the selected item to the destination box by translocating the robot arm holding the selected item along a predetermined trajectory towards the destination box, and releasing the selected item into the destination box.

In some aspects, a system for fulfillment of an order including a set of items disposed in a set of boxes, the boxes being disposed on a set of shelves, includes a set of runner apparatuses. Each runner apparatus includes a platform for holding a box, and a lift coupled to the platform for vertical translocation of the platform. The system further includes a picker apparatus including a base portion that is immovable, and a robot arm coupled to the base portion to removably engage with items to be picked. The system further includes a server communicably coupled to the set of runner apparatuses and to the picker apparatus. The server is configured to receive a specification of the order including the set of items, and to generate a set of commands for fulfillment of the order. The server is further configured to select a runner apparatus from the set of runner apparatuses as a first runner apparatus, and transmit, to the first runner apparatus, a first command to retrieve a first box of the set of boxes for presentation to the picker apparatus, the first box having disposed therein a set of identical instances of that item. The server is further configured to transmit, to the picker apparatus, a second command to sort that item from the first box to a destination box. The first runner apparatus is configured to retrieve, and subject to the first command, the first box by moving to a location proximate to the first box, and via the lift of the first runner apparatus, moving the platform of the first runner apparatus to the same height as the first box. The first runner apparatus is further configured to retrieve the first box by drawing the first box off its associated shelf of the set of shelves and onto the platform. The first runner apparatus is further configured to present the first box to the picker apparatus by moving to a location proximate to the picker apparatus, and via the lift of the first runner apparatus, moving the platform holding the first box to a predetermined height for access by the picker apparatus. The picker apparatus is configured to pick, subject to the second command, that item by imaging at least a portion of an interior of the first box to identify and select an instance of that item from the set of items as a selected item, identifying a pick point of the selected item, and via the robot arm of the picker apparatus, engaging with the identified pick point of the selected item to pick the selected item out of the first box. The picker apparatus is further configured to move the selected item to the destination box by translocating the robot arm holding the selected item along a predetermined trajectory towards the destination box, and releasing the selected item into the destination box.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

FIG. 5 illustrates items in a box that have picking/gripping points, where the gripper/vacuum cup of the runner apparatus can attach to.

FIG. 11A illustrates the picker apparatus picking an item from a box held by a runner apparatus.

FIG. 11B illustrates the picker apparatus of FIG. 11A placing the picked item in a destination box on a shelf.

FIG. 11C illustrates the picker apparatus of FIG. 11A picking another item from another runner apparatus.

FIG. 11D illustrates the picker apparatus of FIG. 11A picking yet another item from yet another runner apparatus.

Figure 1:
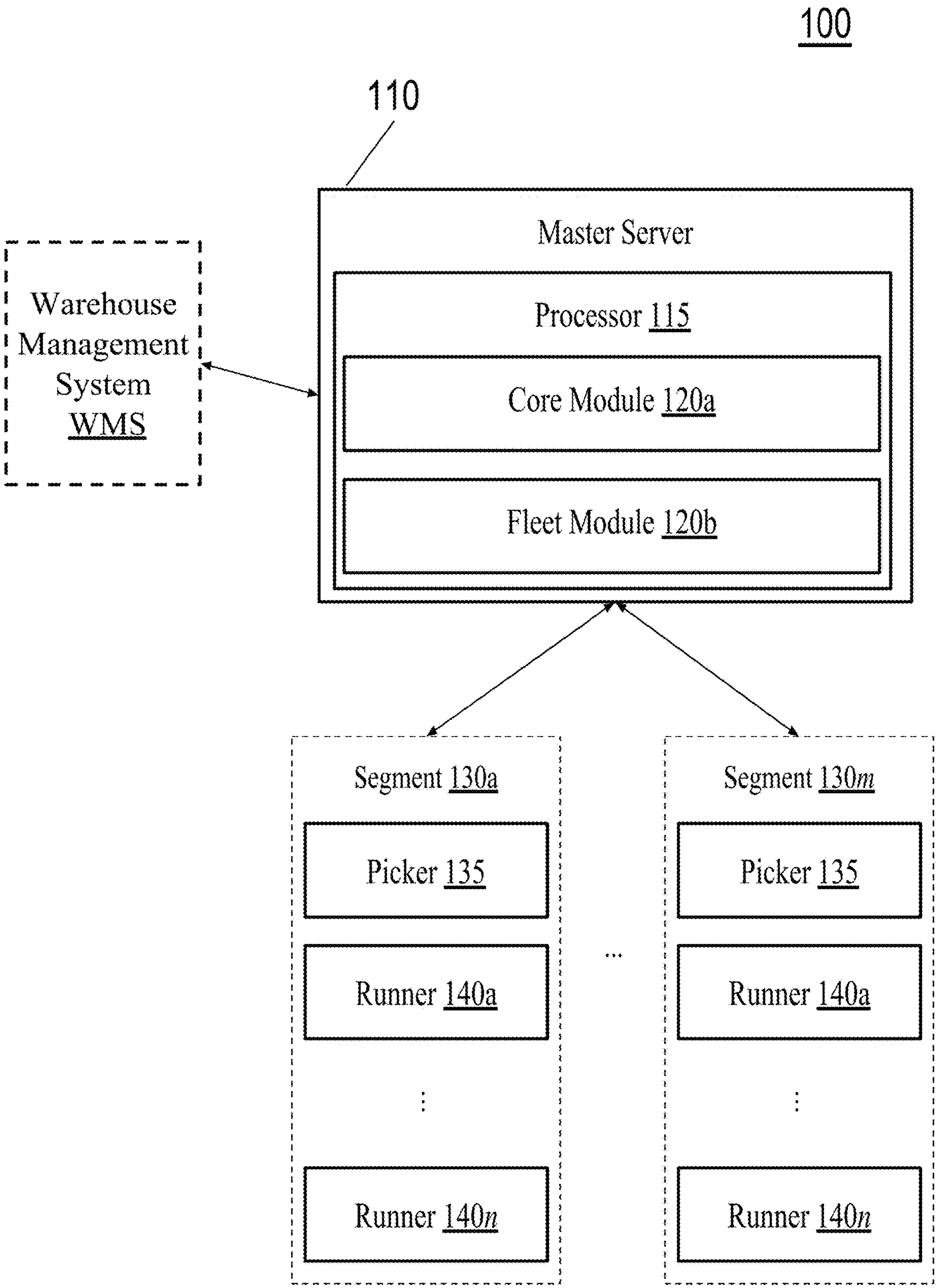
FIG. 1 illustrates an example system for order fulfillment.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Aspects of the systems, apparatuses, and methods disclosed herein relate generally to warehouse robotics, automatic order fulfillment, automated storage and retrieval system. FIG. 1 illustrates an example system 100 for order fulfillment that includes a master server 110, one or more picker apparatuses 135, and one or more runner apparatuses 140*a*-140*n*. As also illustrated in FIG. 1, and as explained in greater detail later, the picker apparatuses 135 and the runner apparatuses 140*a*-140*n* can be organized into segments 130*a*-130*m*, with each segment including at least one picker apparatus 135 and one or more runner apparatuses 140. FIG. 1 also illustrates a warehouse management system WMS that communicates with the system 100, and the server 110 in particular, to carry out order fulfillment and other activities.

Briefly, the picker apparatus 135 can be, at least in part, generally immobile, anchored, anchor-able, and/or otherwise fixable apparatus that is associated with an order consolidation area/shelves, and is configured to pick and move items between boxes/containers held by the runner apparatuses 140*a*-140*m* associated therewith (e.g., associated with/assigned to the same segment as the picker apparatus) and the shelves, such as boxes on the shelves. The runner apparatuses can be generally mobile apparatuses that can move boxes/containers between storage shelves and the order consolidation area, to affect movement of items that in turn can be manipulated by the associated picker apparatus. Each of these aspects of the system 100, and other components, are described in turn.

Segments

Each of the segments 130*a*-130*m* can include at least one picker apparatus 135 and at least one runner apparatus 140*a*. Any given segment can be a logical grouping such as, for example, an association between its picker apparatus(es) and runner apparatuses as specified by the server 110. Additionally or alternatively, any given segment can be a physically constrained grouping such as, for example, picker apparatus (es) and runner apparatuses that are physically assigned and/or confined to one section of a warehouse.

Segments can be specified at the server 110 on any suitable basis such as, for example, for different product items (e.g., a first segment for dry storage, another segment for frozen items, and/or the like), based on warehouse layout, frequency (e.g., how often that item is sold across orders) or seasonality (e.g. whether that item is undergoing seasonal/cyclical demand or not) of the items, and/or the like. In some cases, the number of runner apparatuses assigned to a given segment can be selected so as to saturate the picker apparatus's performance, i.e., to bring items to the picker apparatus such that it is in substantially continuous operation. In some cases, such as during an emergency, when a runner apparatus is in-operational, when a large order is received, during operational considerations associated with the warehouse (e.g., construction, broken machinery, etc.) and/or the like, a runner apparatus can be dynamically reassigned from one segment to another.

Picker Apparatus

Figure 2:
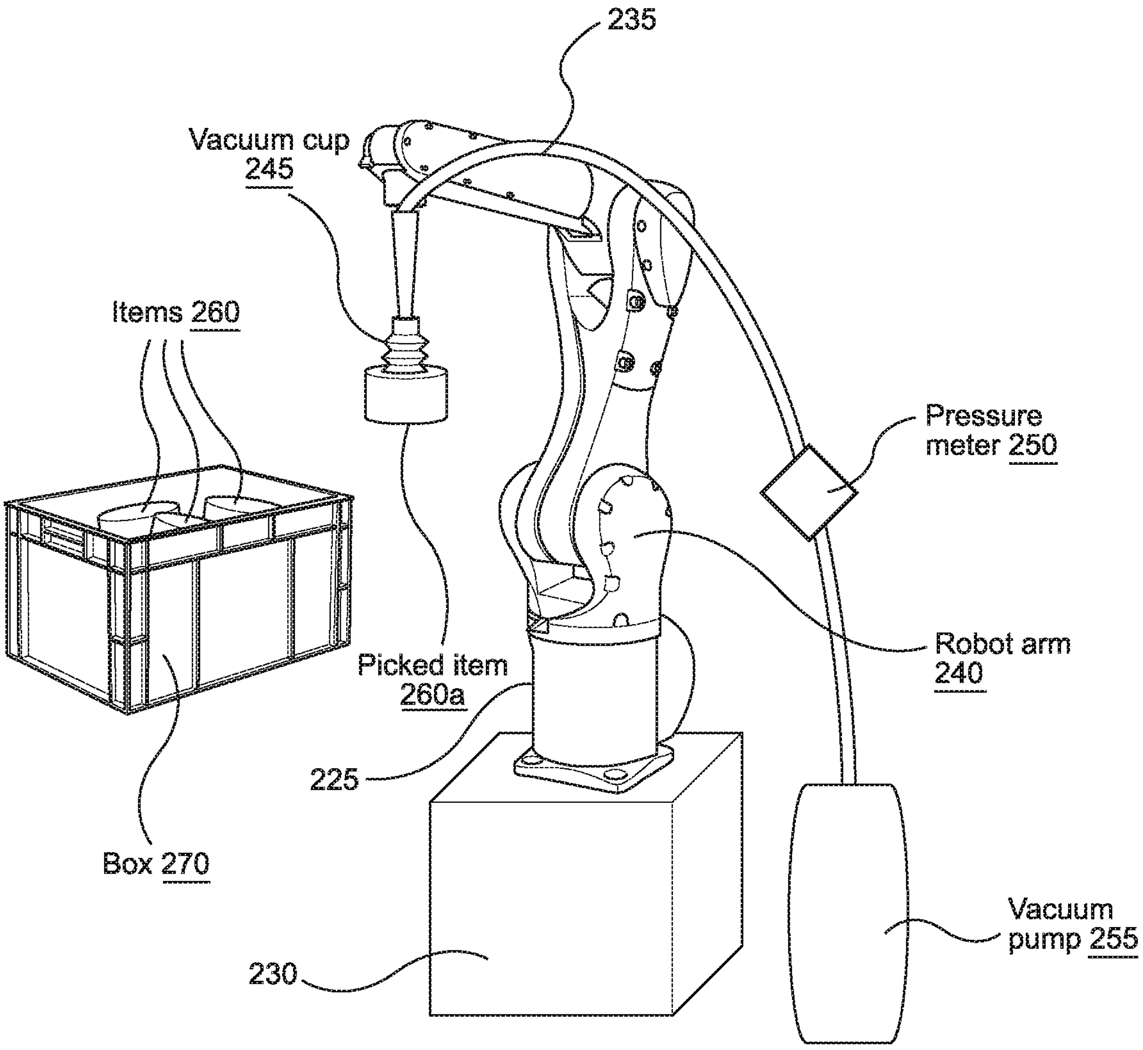
FIG. 2 illustrates a picker apparatus when picking one item from a box/shelf using a vacuum cup.

FIG. 2 illustrates an example picker apparatus 235 that includes an arm 240. The arm 240 can be fixedly attached, such as to a base 225 and/or a pedestal 230, or even the floor of the warehouse (not shown), to prevent translocation, for mechanical support, and/or the like. In some cases, the robotic arm 240 is a 4-axis, 5-axis, or 6-axis arm with a reach (e.g., horizontal reach from its affixed location) of about 0.5 m, about 1 m, about 2 m or more, including all values and sub-ranges in between. The arm 240 includes or is coupled to a vacuum cup 245 (also sometimes referred to as a gripper) configured to manipulate items, such as to pick, transfer, and/or place items. As an example, the cup 245 can include a vacuum cup gripper with a diameter being approximately 0.5 cm to approximately 15 cm, including all values and subranges in between. In some cases, the cup 245 can encompass a linear or 2-dimensional array of vacuum cup grippers, each sized as mentioned herein. The arm 240 can have a load bearing capacity of about 5 kg or less, about 5 kg, about 8 kg, about 10 kg or more, including all values and sub-ranges in between. In some cases, a dual-arm assembly with two arms can be employed to improve picking speed such as, for example one arm for picking relatively smaller/lighter items and another arm for picking relatively larger/heavier items, each with its own set of vacuum cup grippers that can be the same size (of an individual vacuum cup gripper) or different, and have the same or different number of vacuum cup grippers.

It is understood that any suitable gripping mechanism can be employed in addition or alternatively to the illustrated vacuum cup 245 such as, for example, a two-finger gripper, or multiple-finger gripper, a combined gripper (e.g. vacuum cup combined with two fingers) can be used. In some cases, a robotic tool exchanger can be used to automatically exchange different types or sizes of the gripper without manual intervention. The arm 240 can optionally include its own controller/processor (also sometimes referred to as a robot controller) to control operation of the arm 240. Generally, a controller of the arm 240 can be useful for features such as, but not limited to, generating direct current to power motors of the robotic arm, execute a manufacturer's operating system, implement safety controls, provide the functionality associated with a robotic pendant of the arm, and/or the like.

The picker apparatus 235 can further include a pressure meter 250 and a vacuum pump 255 fluidly coupled to the vacuum cup 245, to measure, monitor, and/or detect and manipulate the suction force applied to the vacuum cup. In some cases, in addition or alternative to the pressure meter 250, a flow sensor or flow meter (not shown) can be employed to measure flow rate. The vacuum pump/generator 255 can be any suitable device such as, for example, a capture pump (e.g., a cryopump, a sputter ion pump, etc.), a transfer pump, a kinetic pump (e.g., a turbomolecular pump, a vapor diffusion pump, etc.), a positive displacement pump (e.g., an oil sealed rotary vane pump, a liquid ring pump, a diaphragm pump, a scroll pump, a roots style pump, a claw pump, a screw pump, etc.), a venturi device, an industrial blower, and/or the like. In some cases, the vacuum pump 255 can include an industrial vacuum generator by means of Venturi tube connected to a compressed air supply (e.g. Festo OVEM-14-H-B-GO-CE-N-2P).

In some cases, the pressure meter 250 can measure relative vacuum pressure, i.e., negative pressure compared to ambient or atmospheric pressure. In some cases, the pressure meter 250 can have a configurable pressure threshold which can be fixed during the operation, and return a binary value (e.g., to a processor of the picker apparatus, to the master server 110, and/or the like) indicative of whether, based on whether the measured pressure exceeds the pressure threshold or not, the cup 245 is holding the item or not. Such an approach can be useful for picking one or a few kinds of items with similar surfaces. In some cases, the pressure meter 250 and/or a picker processor coupled thereto can dynamically/in real time report the measured pressure to server 110, which can compare the measured pressure against a predetermined threshold specific for the item/product being picked, to determine whether a pick has been successfully made. As an example, for picking porous items such as socks, the pressure threshold can be set to permit for some leakage/loss of suction. As another example, for items with a solid plastic surface, the pressure threshold can be set to permit for little or no leakage, since any leakage would indicate that the item has not been properly attached.

The picker apparatus 235 can further include one or more processors (also sometimes referred to as the picker processor(s)) and a memory/database. The memory/database can encompass, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory/database can store instructions to cause the one or more processors to execute processes and/or functions associated with the picker apparatus 235 (e.g., arm operation) and/or generally with the system 100 (e.g., network settings). The one or more picker processors can each (independently) be any suitable processing device configured to run and/or execute a set of instructions or code associated with its picker apparatus 235 and/or the system 100. Each picker processor can be, for example, a general purpose processor, a Field Programmable Gate Array (FPGA), an Application Specific Integrated Circuit (ASIC), a Digital Signal Processor (DSP), and/or the like. The processor(s) and memory/database can be included in a compute device, such as a desktop computer, a laptop computer, a tablet computer, and/or the like, associated with the picker apparatus 235. The picker processor can be further configured to provide an interface (e.g., an Application Programming Interface (API)) for communication with the master server 110 over a wired or wireless network.

The picker processor is communicably coupled to the arm 240 (e.g., directly, or to a robot controller of the arm) to control motion of the arm. The picker processor can be further communicably coupled to the vacuum pump 255 to manipulate the turning on, turning off, or changing the level, of vacuum generation and of ejection of air (to release a held item). The picker processor can be further communicably coupled to the pressure meter/sensor 250 to receive, for example, a digital or analog input as a measure of vacuum pressure, and to compare the value of pressure against a predetermined dynamic or static threshold value to achieve the desired modulation of vacuum pressure at the cup 245. Similarly, the picker processor can be coupled to a flow sensor for measuring flow of air in the cup 245 as described herein.

The picker apparatus 235 can further include one or more cameras for item identification, tracking. etc. The camera(s) can include, for example, 3-dimensional (3D) camera(s) stereoscopic camera(s), conventional cameras (e.g., including at least an aperture and a film or digital sensor) that can be in greyscale or color. In some cases, the camera(s) include at least one conventional camera configured for detection of texture of the item to be manipulated. In some cases, the camera(s) include at least one 3D camera capable of texture detection by generating a point cloud. The camera(s) can be communicably coupled to the picker processor for control of operation thereof. In some cases, the camera setup can be generally as that disclosed in U.S. Pat. No. 10,965,891 (e.g., at least in FIGS. 28 and 29), the entire disclosure of which is incorporated by reference herein.

Figure 10:
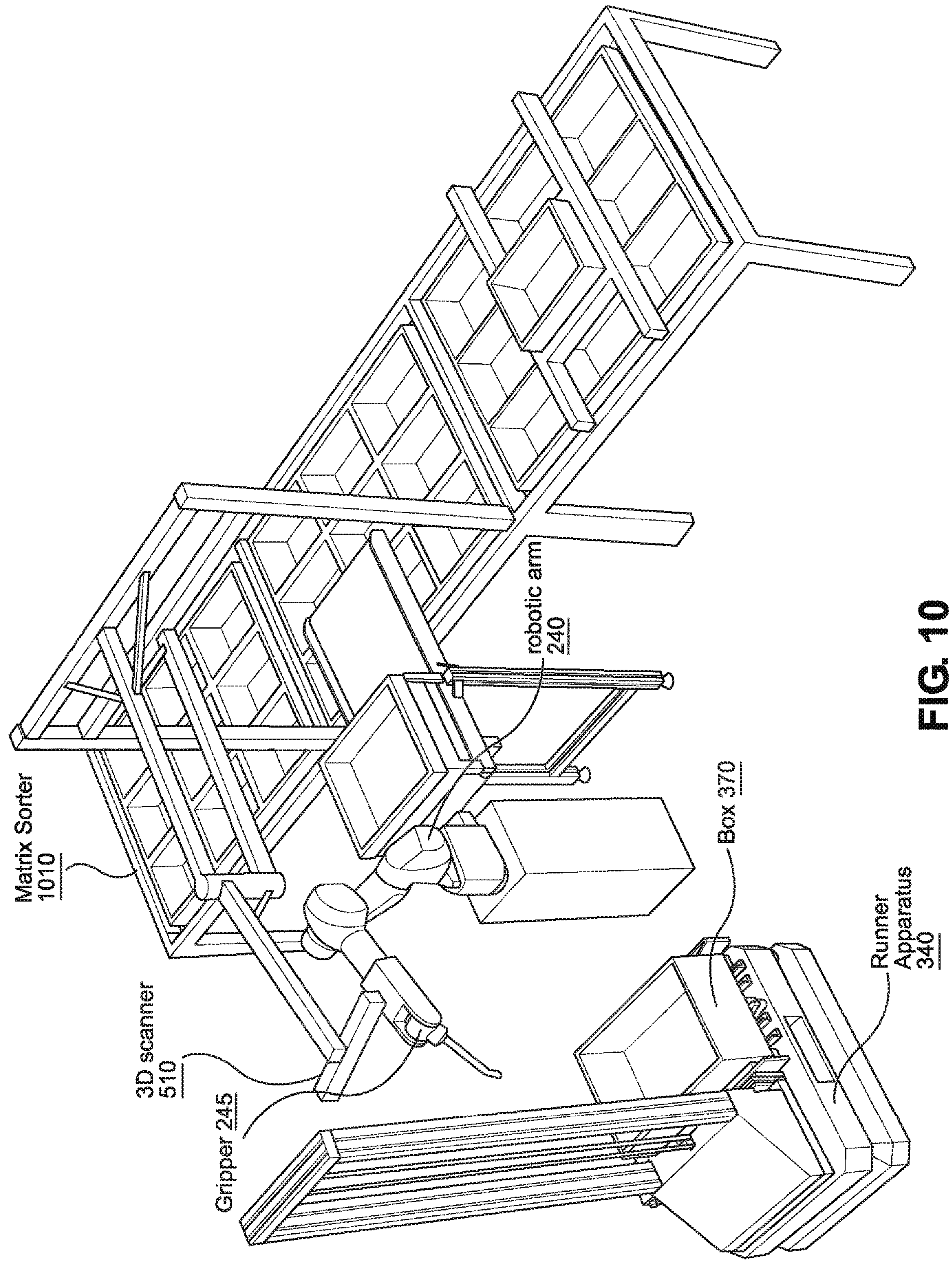
FIG. 10 illustrates example operation of a picker apparatus interacting with a runner apparatus.

In some cases, one or more of the cameras can be physically mounted on the picker apparatus 235, as shown in FIGS. 11A-11D. In some cases, one or more of the cameras can be mounted on another structure and communicatively coupled to the picker apparatus 235. For example, FIG. 10 illustrates the camera as a 3D scanner 510 coupled to a fulfillment station disposed in proximity to where the picker apparatus is installed and picks from. Generally, the camera can be disposed in any location where it can scan the volume of a box presented by one or more runner apparatuses when in position around the picker apparatus, i.e., where the box is within a scanning range of the camera. In some cases, mounting the camera on the fulfillment station can result in quicker operation and shorter cycle time (e.g., time to move an item from its origin to a destination), since scanning can begin immediately after a runner apparatus arrives proximate to the picker apparatus.

FIG. 2 illustrates how the picker apparatus 235 can be used to pick an item 260*a* from a box 270 (e.g., a box held by a runner apparatus, and/or on a shelf of an order consolidation area) holding multiple items 260. For example, the picker apparatus 235 can receive a command from the master server 110 to move an item from a box held by a runner apparatus to a box in the order consolidation area. The picker processor can be configured to receive the command, execute it, and provides feedback (e.g., an indication of success, failure, other details, and/or the like) back to the master server 110.

Once the command is received, the picker processor can be further configured to plan a trajectory for the robot arm 240 that is collision-free, i.e., where any portion of the arm, the suction cup, and (once picked) the picked item 260*a* does not strike or bump into other objects, such as other portions of the picker apparatus, the runner apparatus(es), sides of the boxes the item is being moved from/to, shelving in the order consolidation area, and/or the like. As an example, the picker processor can generate a random potential trajectory for the robotic arm 240, beginning in the start position (e.g., over an item to be picked from an origin box), and ending in the desired position (e.g., a destination box). For example, in some cases, approaches based on "motion primitives"—short, kinematically feasible, motions—can be employed to generate one or more trajectories. Generally, approaches based on motion primitives first discretize the space, then create motion primitives between neighboring points, and then perform a graph search to find a path between a start point and an end point.

As another example, in some cases, the picker processor can employ a stochastic trajectory optimization framework known as STOMP (Stochastic trajectory optimization for motion planning), as briefly described herein. STOMP generates noisy trajectories to explore the space around an initial (possibly infeasible) trajectory, and these trajectories are then combined to produce an updated trajectory with lower cost. A cost function based on a combination of obstacle and smoothness cost can be optimized in each iteration. No gradient information may be required by optimization algorithm employed, so general costs for which derivatives may not be available (e.g. costs corresponding to constraints and motor torques) can be included in the cost function. The stochastic nature of STOMP can allow it to overcome local minima that gradient-based methods like CHOMP can get stuck in.

As another example, in some cases, CHOMP (Covariant Hamiltonian optimization for motion planning) can be employed. Briefly, CHOMP capitalizes on covariant gradient and functional gradient approaches to the optimization stage to design a motion planning algorithm based entirely on trajectory optimization. Given an infeasible naive trajectory, CHOMP reacts to the surrounding environment to pull the trajectory out of collision while simultaneously optimizing dynamical quantities such as joint velocities and accelerations. It rapidly converges to a smooth collision-free trajectory.

As another example, a man-in-the-middle approach can be used for trajectory planning Say, the trajectory includes motion between points A and B. A midpoint C is chosen somewhere between the A and B, and recursively, AC and CB trajectories are generated. If at least one of the trajectories AC and CB cannot be successfully generated (e.g., is not collision free), the point C is moved farther away from the midpoint between A and B, and the process is repeated till both AC and CB can be successfully generated.

In some cases, other techniques based on graph theory can be employed for trajectory planning For example, a graph for the trajectory can be constructed, with each node of the graph representing some position during the motion. An edge/connections between two nodes can be present when the motion between those nodes/positions is possible. In some cases, the step or displacement between neighboring nodes/positions can be very small (e.g., less than 1 mm, about 1 mm, about 2 mm, about 3 mm, about 10 mm, more than 10 mm, including all values and sub-ranges in between) to permit for granular movement. In this manner, trajectory planning can then be formulated as the shortest path problem in that particular graph, and solved by methods of graph theory. In some cases, the graph can be represented by a neural network with cells represent the nodes and with weights represent the edges, which can account for the possibility of the motion associated with that edge. The solution to the graph can be achieved by dynamic evolution of the network state, which in turn can allow for fast parallel computation on some specialized processors, such as, for example, graphical processing units (GPUs).

Any trajectory generated as described herein can then be checked to be collision free by using mathematical calculations in a simulated environment around the picker apparatus such as, for example, a cube-shaped space defined by or based on the maximum reach of the arm 240. In particular, the trajectory can be finely divided to many points with a very small step size (e.g., 0.1 mm) Then, for each of these points of the trajectory, it is checked whether the model of the robot arm 240 (represented as a polyhedron, or set of polyhedrons) in that point of the trajectory collides with the environment as scanned or with pre-defined objects in the environment. This is done by checking whether the polyhedron(s) representing the robot arm geometrically intersect with other objects (e.g., also represented as polyhedrons) or with points of the 3D point cloud. If a (possible) collision is found, the trajectory is rejected and another one is generated. This is done till it is determined that that trajectory will result in no collisions.

Multiple trajectories can be simultaneously generated and evaluated via any approach described herein. In some cases, the shortest, collision-free trajectory can be selected for motion of the robot arm to reduce motion time. In other cases, the first trajectory found to be collision free can be selected for motion of the robot arm in order to save analysis time. In some cases, a first set of trajectories are generated for picking an item, and a second set of trajectories are generated for placing the item, as disclosed herein. In other cases, a single set of trajectories, encompassing both the picking and placing of an item, can be generated and evaluated as described herein. In some cases, trajectories are generated for each item of a set of pickable items, and a confidence value can be associated with each trajectory indicating a likelihood of success of picking and/or placing that item. The trajectory with the high confidence value, and its corresponding item, can then be selected.

To pick an item, in some cases, the picker processor can employ/execute any suitable non-machine-learning (non-ML) based approach to recognize the items to be picked such as, for example, geometric analysis of the surface of the item to identify an attachment point. In some cases, the picker processor can employ/execute a suitable ML approach such as a convolutional neural network (CNN). For example, an instance segmentation network can be used to recognize multiple instances of the items to be picked, such as from a bin holding multiple items. Of the multiple items, a single item can be selected for picking such as by, for example, selecting the item associated with a selected trajectory having the highest confidence value as described herein. In some cases, all items associated with trajectories having a confidence value greater than a predetermined threshold are selectable, and the item among these that is first identified is then selected for picking and placing.

Figure 5:
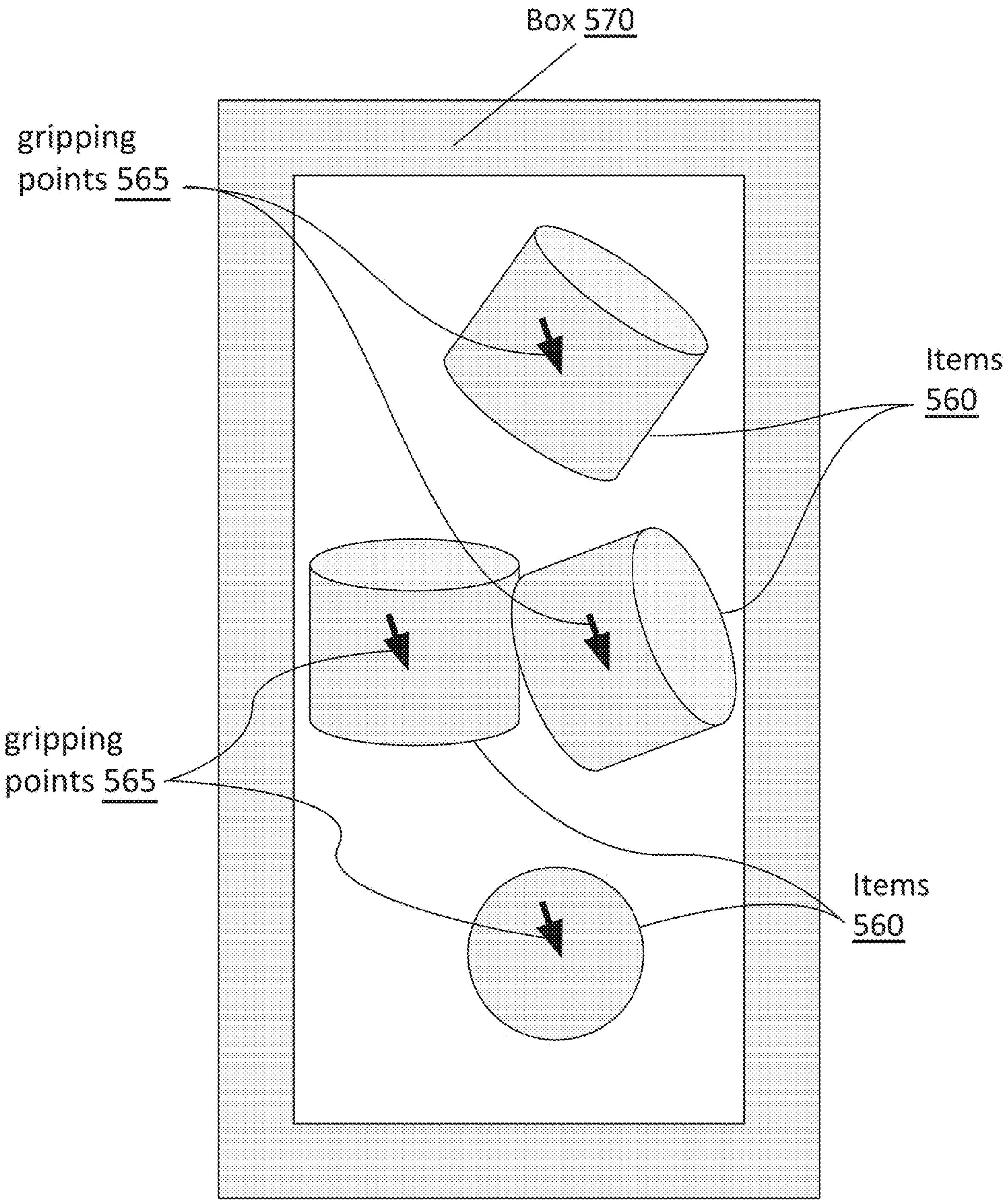

Then, a geometric center of the item can be estimated (e.g., as a pseudo indicator of a center of gravity) to select the pick point. In some cases, the geometric center of the smoothest area of the object/item can be estimated and selected as the pick point. In other cases, a neural network is used to (directly) choose points in areas where the gripper is expected to attach successfully, without recognizing specific instances of the objects. In other cases, a CNN is employed but instead of recognizing the items, the CNN evaluates a depth map and generates a surface "fitness" value for each point in the map, in order to identify points where it is possible or best to attach to the item based on the fitness values. FIG. 5 illustrates items 560 in a box 570, where the neural network has identified gripping points 565 for each item in the box. In some cases such as, for example, where the cup 245 is oblong or elliptical in profile, the neural network can also determine a desired orientation of the cup 245 when picking an object so as to align the longer axis of the cup with a longer dimension of the item to be picked.

These approaches can be combined such as, for example, to use a different, predetermined approach for different items. The approach to be used for a particular item can be pre-defined in an initial configuration/setup of the picker processor, or can be dynamically defined when that specific item is introduced to the warehouse and/or otherwise added to an inventory managed by the warehouse. In some cases these approaches can cycled such as, for example, in case of an unsuccessful pick attempt by one approach, the picker processor communicates with the robot to switch to another approach.

Once a particular approach is selected, the picker processor is further configured to manipulate the robot arm 240 such that the gripper 245 is placed above the item and the vacuum pump 255 is activated, resulting in the item being picked by the gripper 245. Then picker processor is further configured to manipulate the robot arm 240 to move the item 260*a*, along a collision-free path to above the location where the item is to be placed, at which point the vacuum is released with an (optional) ejection of air to separate the item from the gripper 245. During the process of picking and moving, the picker processor can monitor the pressure in the vacuum cup such as by, for example, measuring the pressure directly in the cup/gripper 245, measuring the pressure within the vacuum generator as an indicator of pressure in the vacuum cup, reading a line pressure from the pressure meter 250, and/or the like. According to the measured pressure, the picker processor can determine whether the item is attached firmly, is not attached, or is attached only loosely. If it is determined that the item is not attached (e.g., the item did not attach, or was lost during movement) or is not firmly attached, the process of picking can be repeated a) by attempting to pick the same item again, b) attempting to pick the same item again at a different pick point, if available, or b) by attempting to pick another item from the same location/box.

In some cases when there is continued failure (e.g., say after five failures) to pick up the item or a neighboring item, the picker processor is further configured to employ other approaches. For example, the picker processor can, via control of the arm 240, push or poke items and/or the box holding them to a different position to make picking items possible or more efficient. As another example, the picker processor can be configured to pause operation and then generate and exhibit (or transmit to the master server 110) a notification (e.g., audio and/or visual) to seek assistance from a remote or on-site operator to manually select the desired pick point on an item. As yet another example, the picker processor can be configured to pause operation and then generate and request manual intervention to pick the item. As yet another example, the picker processor can be configured to stop picking items from that box, i.e., mark or indicate the box as problematic and/or not to be picked from. As yet another example, the picker processor can be configured to pick the item from another box.

As another example, consider that the picker apparatus 235 receives a command from the master server 110 to move an item from a first location/box to a second location/box. This can result in the picker apparatus 235 acquiring texture frame/information and point cloud information from its 3D camera/scanner, feed the point cloud data (e.g., in a form of depth map) and texture information to a neural network that can recognize potentially multiple instances of the item to be picked. The location(s) of the found items are then evaluated, and it is checked whether they are accessible by the gripper 245 and the robotic arm 240 without any collisions, as determined by calculating and identifying a trajectory for the robotic arm to reach that position without collision with other objects and/or its environment. Multiple grasping points and multiple positions of the gripper can be used for a single item while searching for a collision-free trajectory. The item for which the trajectory is calculated first, or that item which appears more advantageous or the least-risky (such as having the highest precision value reported by the neural network) is selected for the picking. The robot arm 240 then executes the trajectory. At a time or shortly before the time the gripper 245 reaches the desired gripping position, the gripper is activated, i.e., vacuum is generated. The robot arm 240 is then moved towards the desired placement position for releasing the item, in the second location. This movement is also executed using collision-free path planning. After reaching the desired placement position, the item is released by turning off the vacuum, optionally followed by a short air pulse to ensure ejection. Once completed, the robot arm 240 can be returned to a predetermined default/home position, and the result of the picking is reported as a success to the master server 110. In case of error—the item is released prematurely, or no suitable objects to be picked are found, or no trajectories are found—an error is reported to the master server 110. As described herein, different strategies of grasping can be used for items, such as speed of movement of robot arm during or after grasping, manipulating the robot arm to gently push or poke the items (especially in case of previous error) to change their position, and/or the like.

Figure 6A:
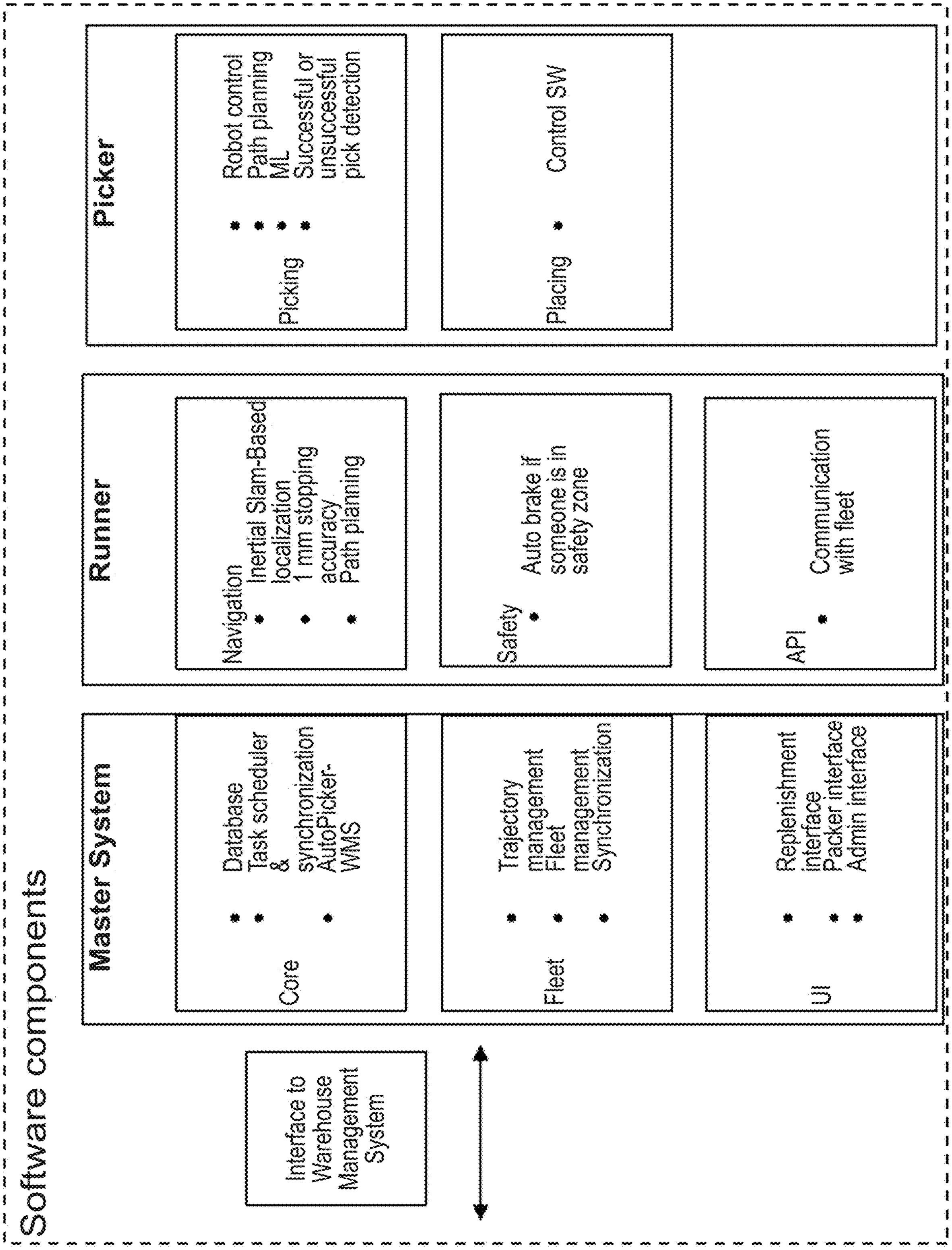
FIG. 6A illustrates example software components of the system of FIG. 1.
Figure 6B:
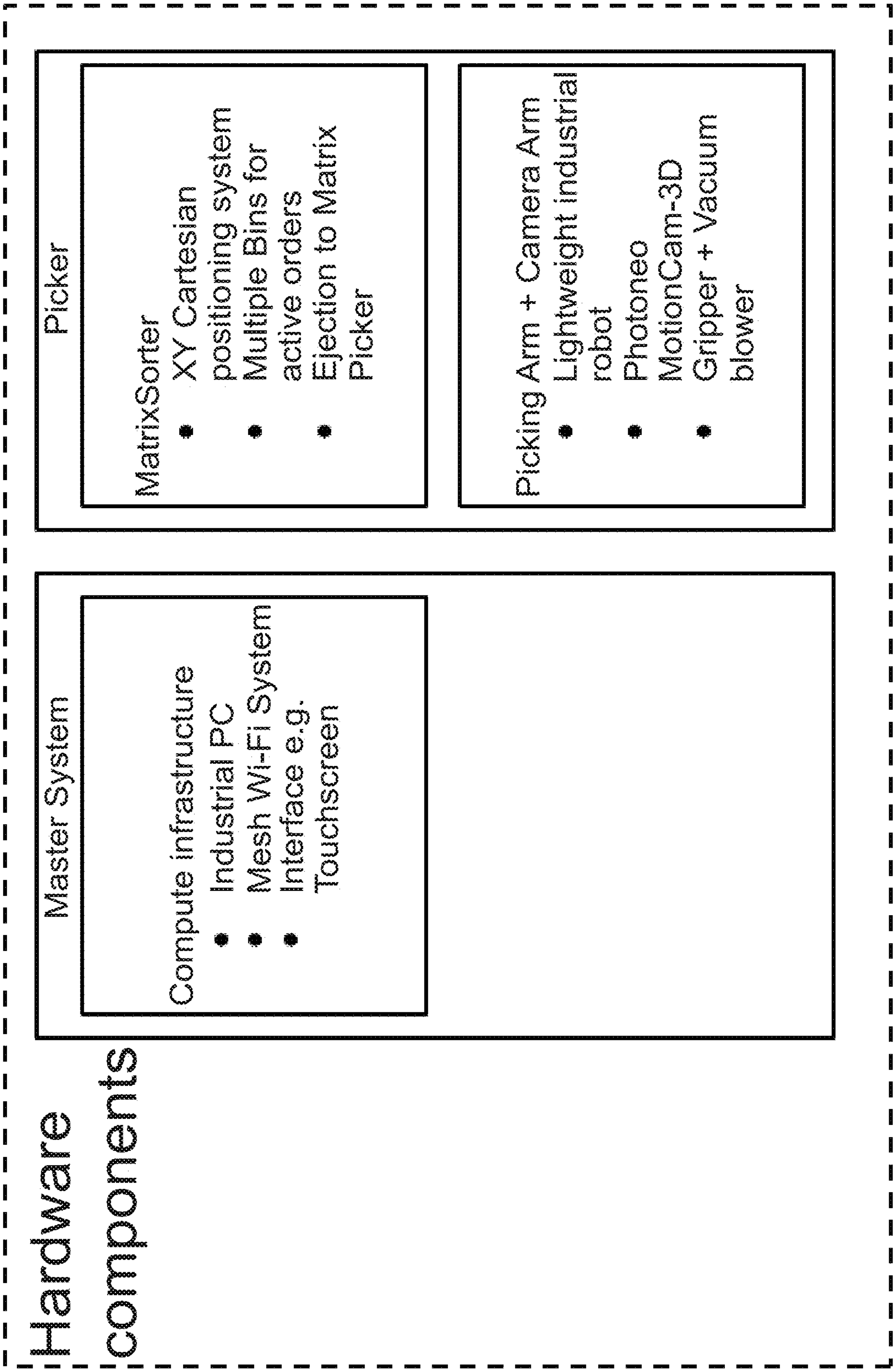
FIG. 6B illustrates example hardware components of the system of FIG. 1.

FIGS. 6A, 6B illustrate several, non-limiting, example functional and hardware aspects of the picker apparatus 235 as described herein, and others. For example, FIG. 6A illustrates that the picker processor can execute picking functionality such as control of the robot arm 240, path planning for collision-free movement of the robot arm, machine-learning approaches such as convolutional neural networks for item detection and attachment, detection of success or failure of a pick attempt. FIG. 6A also illustrates that the picker processor can execute control functionality to (for example) control movement of the robot arm as well as control the vacuum pump 255 to move and place a picked item in its destination location.

Similarly, FIG. 6B illustrates that the picker apparatus 235 can include, encompass, or interact with a conveyor or conveying sorting apparatus (sometimes referred to as a "matrix sorter"), to permit fulfilling of multiple orders substantially in parallel, i.e., in different output boxes. In such cases, the sorting apparatus can include its own positioning system to ascertain the location of each box, as well as a mechanism for moving a box in which an item is to be placed to and from a matrix picker location near the robot arm of the picker apparatus 235. FIG. 6B also illustrates that the picker apparatus 235 can include a combination structure including a robot/picking arm and another arm for holding a camera as described herein.

Figure 7A:
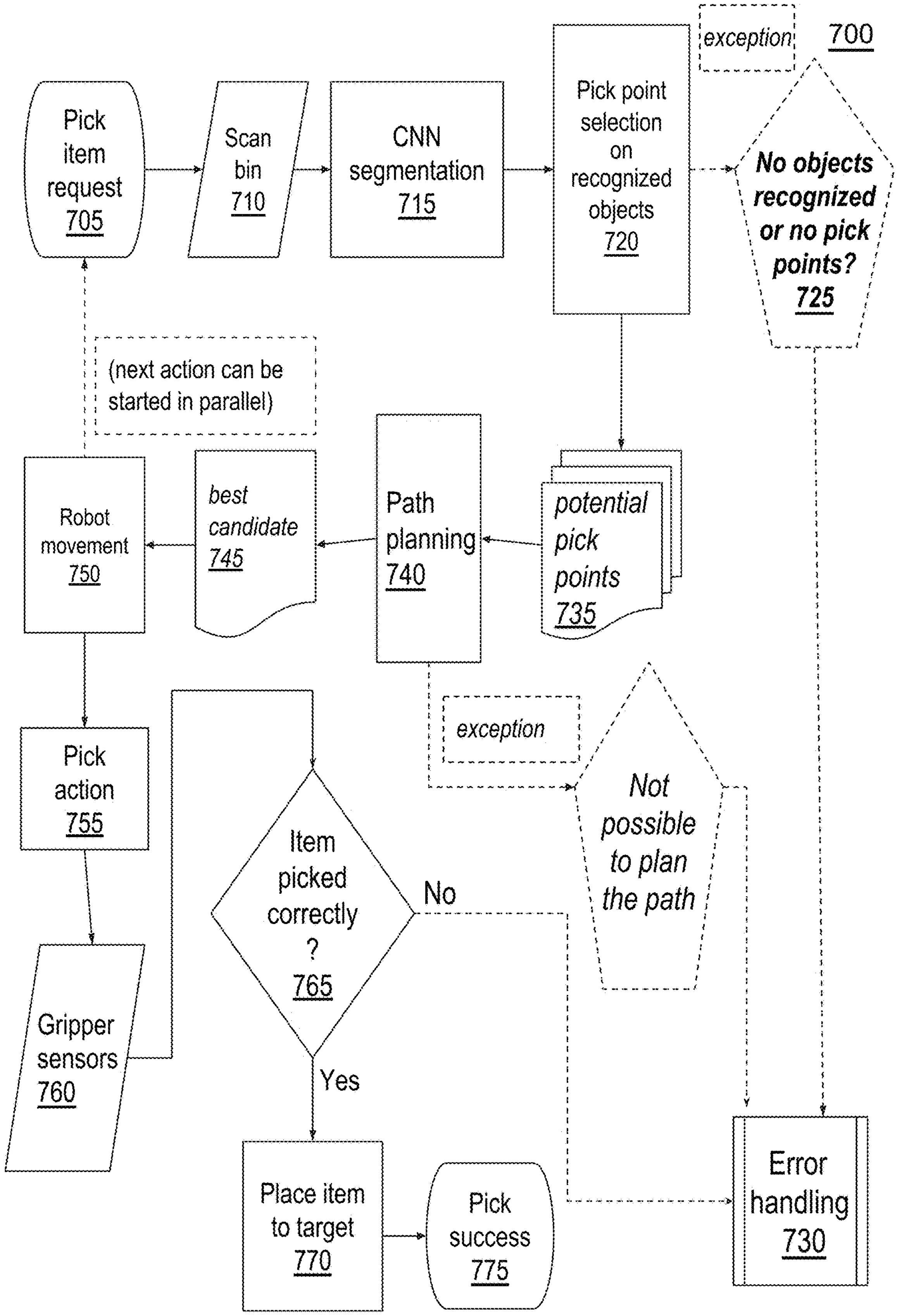
FIG. 7A illustrates an example method for picking an item.

FIG. 7A illustrates an example method 700 of the picker apparatus 235 (e.g., executable by the picker processor) in picking and placing an item that is present nearby in a box retrieved by a runner apparatus. At 705, an instruction/request to pick and move an item is received from the master server 110. At 710, the picker apparatus 235 scans the source box/bin of the item to be moved, such as via a 3D camera for example. At step 715, convolutional neural network-based segmentation is performed/executed to identify one or more of the items, and at step 720, pick points on the detected items are identified. If no items and/or pick points are identified as determined at step 725, error handling procedures as described herein (e.g., try another item, invoke manual intervention, etc.) are invoked at step 730. Pick points on the detected items can be identified in any suitable manner including, but not limited to, any suitable RGB image-based technique, a point cloud-based technique, template matching (each item is configured with a template and then scanned for a match), key features (detecting and matching key points and known object models), plane grasping detection (finding the detection triangle of grabbable portions of the item), depth maps generated by the 3D camera (e.g., each potential pick position being assigned a quality measure), and/or the like.

If pick points are detectable, then a potential pick point is selected at step 735. Next, at step 740, path planning for the movement of the robot arm is carried out as described herein, i.e., by generating and analyzing multiple random paths. At step 745, the best candidate path is selected, such as one where there are no collisions. At step 750, movement of the robot arm is affected based on the selected path. At step 755, the pick action is executed by, for example, activating the vacuum pump 255 and moving the robot arm 245 towards the item to be picked. At step 760, vacuum sensors are read to determine, at step 765, if the item was picked correctly. If this is not the case, the error handling at step 730 can be invoked. If it is determined that the item was picked correctly, then at step 770 the item is moved to and placed in its target/destination location, such as by modulating the pressure from the vacuum pump 255. At step 755, an indication of success is transmitted to the master server 110.

Figure 7B:
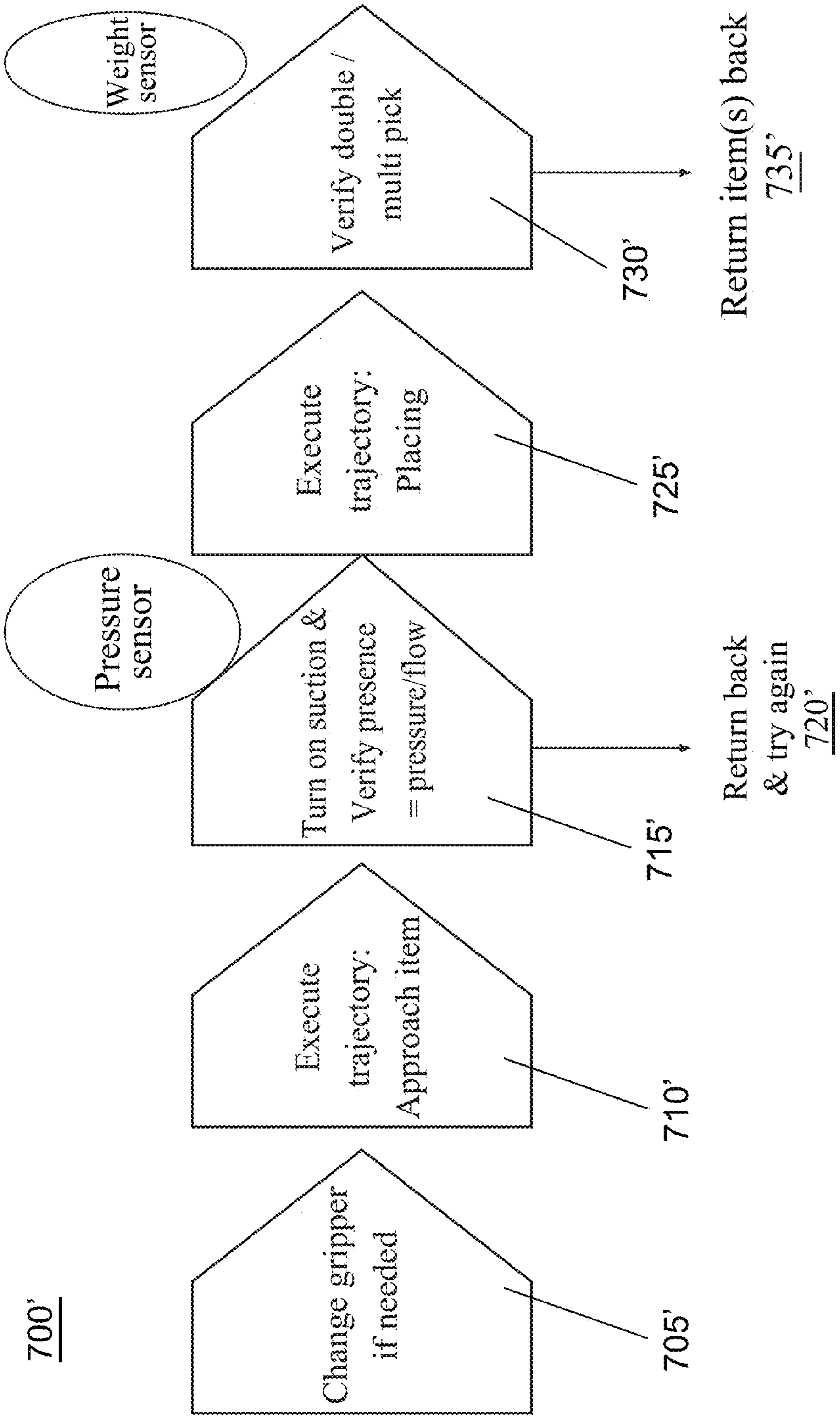
FIG. 7B illustrates another example method for picking an item.

FIG. 7B illustrates an example method 700' of the picker apparatus 235 (e.g., executable by the picker processor) in picking and placing an item that is present nearby in a box retrieved by a runner apparatus, aspects of which can be employed in combination with the method 700. At step 705', after receiving an indication of an item to be manipulated, the picker apparatus 235 can verify (e.g., when the picker apparatus includes multiple robot arms, each with a different vacuum cup/gripper) that the right gripper is selected for use with that item, and change the selection of gripper if needed. At step 710', a previously-identified path/trajectory for that gripper and its associated robot arm is executed to approach the item to be picked. At step 715', the vacuum pump 255 is activated to turn on the suction pressure in the selected vacuum pump, and the picking of the item is verified by (in this example approach) determining if the ratio of detected pressure to detected flow exceeds a predetermined threshold. Said another way, when an item is successfully picked, flow should be low/minimal, and this ratio should be high. If the item is not successfully picked, flow should be high, and this ration should be lower. If it is deemed that the item is not successfully picked, then another attempt is made at step 720'. If it is deemed that the item is successfully picked, then the previously-identified path/trajectory is executed to move and place the item in its destination box, at step 725'. At step 730', it is verified if the correct item, and the correct quantity of the item, was moved, such as by measuring a weight sensor under the destination box. If it is deemed that multiple items were accidentally picked, then at step 735', all items are returned to the origin box by the picker apparatus 235 and the process is repeated. In this manner, aspects of the invention are useful for picking smaller, lighter items where the correct vacuum cup can be selected for picking such items, and inadvertent picking of multiple items can be automatically rectified.

Runner Apparatus

Figure 3A:
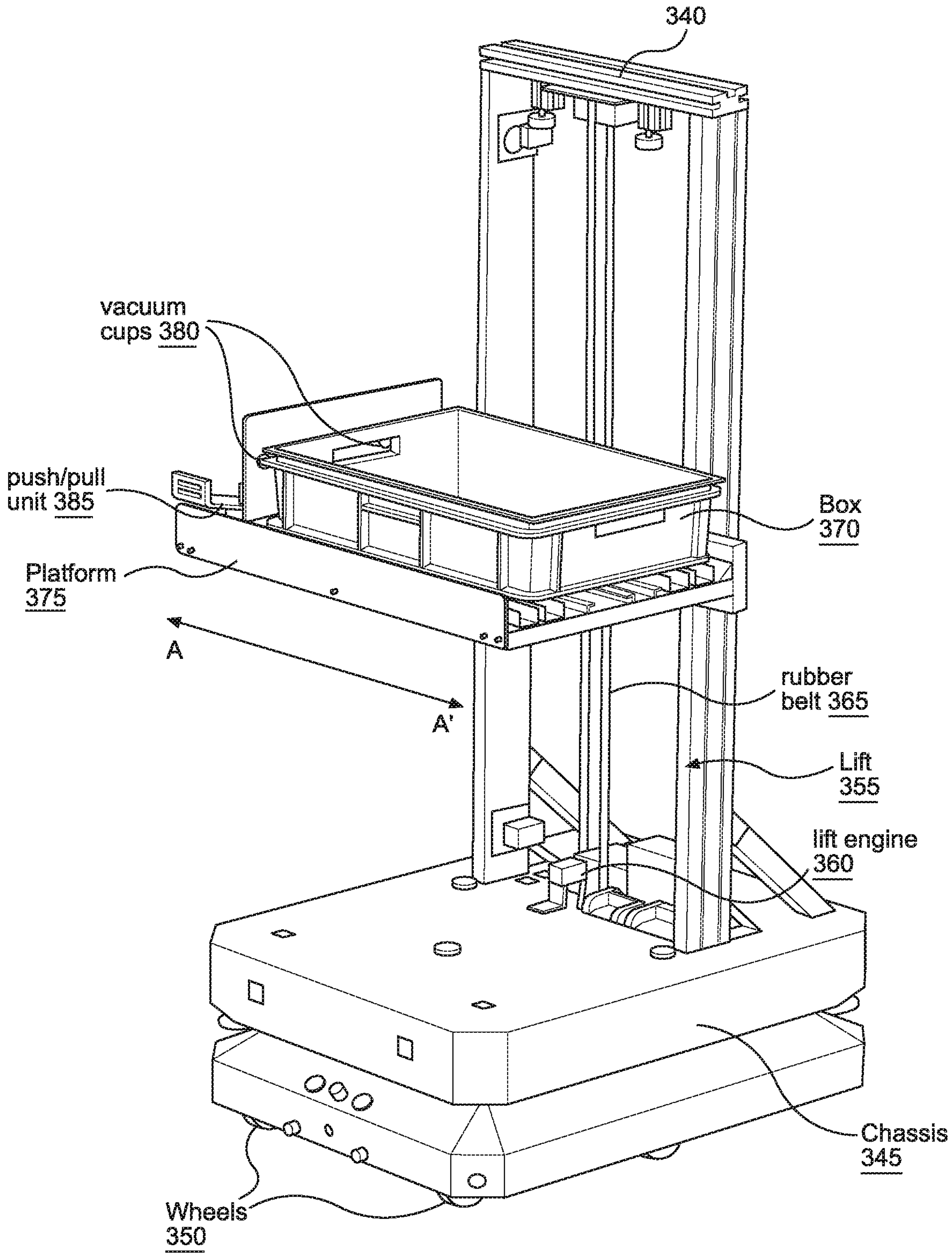
FIG. 3A illustrates a perspective view of a runner apparatus.
Figure 3B:
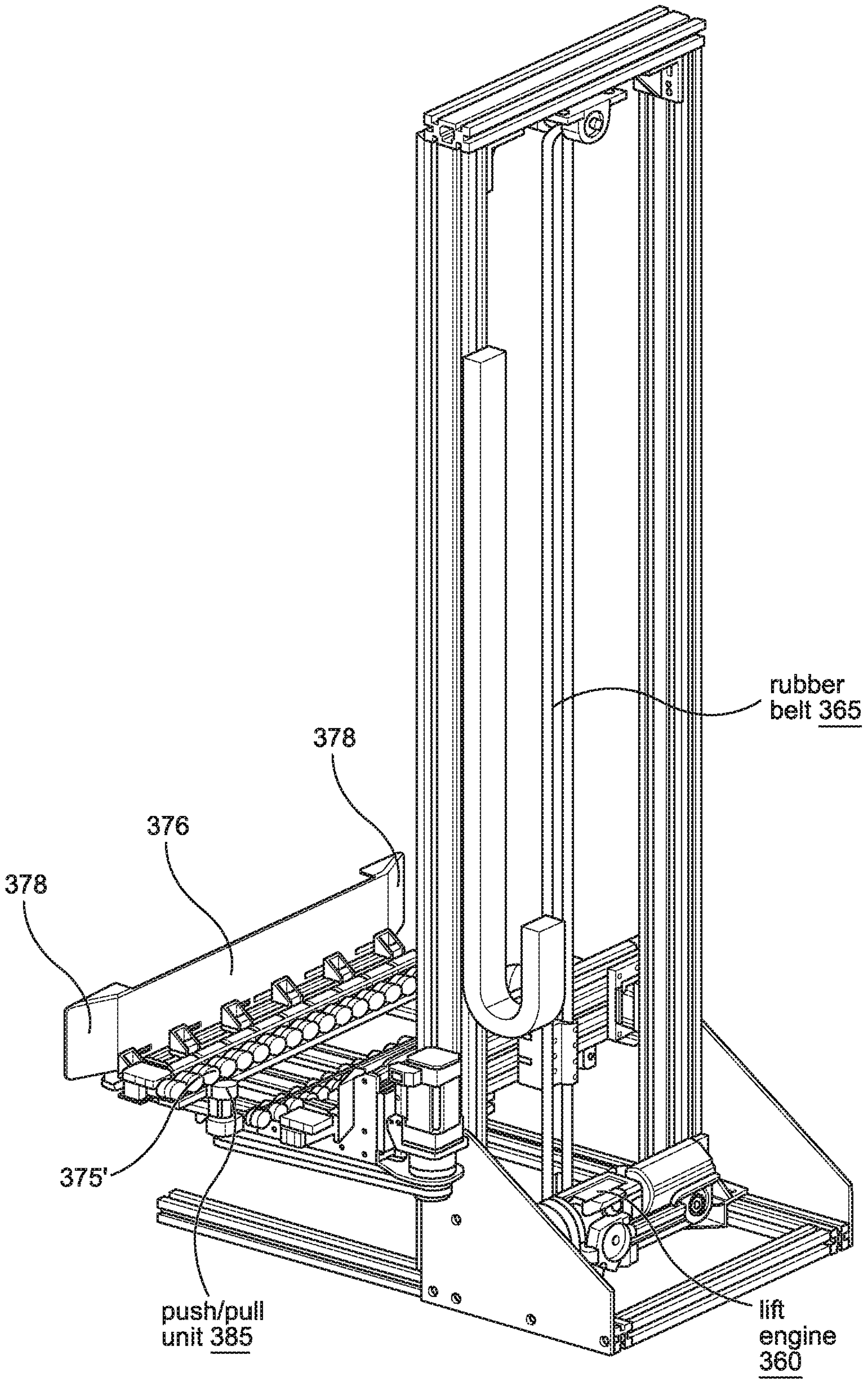
FIG. 3B illustrates a lift of another runner apparatus where the platform wall has been modified to enable smoother entry of the box while the box is pulled.
Figure 3C:
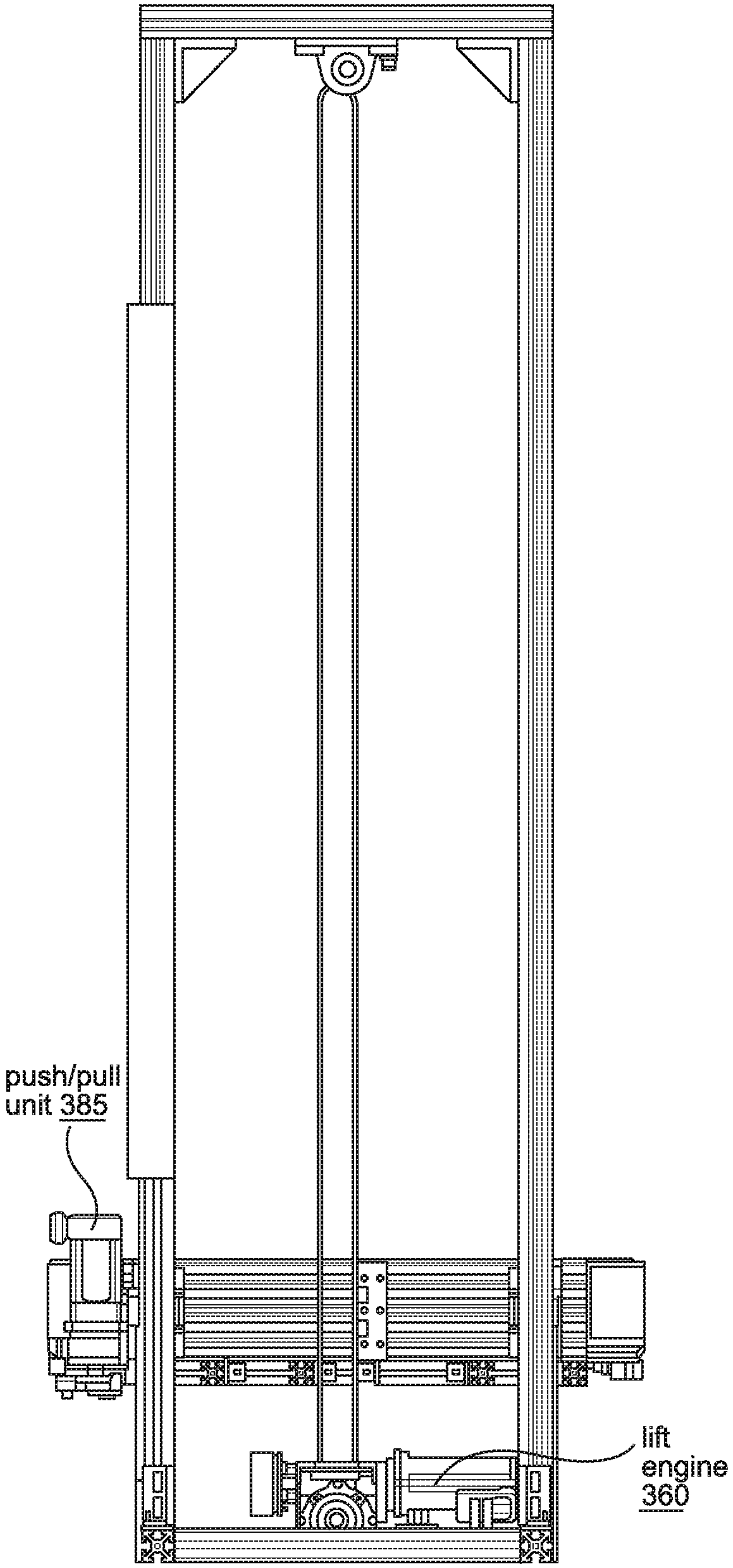
FIG. 3C illustrates a rear view of the lift of FIG. 3B.

FIGS. 3A-3C illustrate an example runner apparatus 340 (also sometimes referred to as an autonomous mobile robot, or AMR) that includes a chassis/body portion 345 composed of a durable material such as steel, one or more motors (e.g., servo motors, not shown) to actuate a set of wheels (e.g., four wheels) for mobility. The runner apparatus 340 can also include one or more motion (e.g., odometry) sensors to measure the rotation of the wheels so as to detect the distance travelled by each wheel, one or more 3D sensor(s) or cameras used for safety and mapping, and a battery to power operation of the runner apparatus 340. For example, the runner apparatus 340 can include one or more proximity sensors such as, for example, distance sensors which report distance to a runner processor (described below) of the runner apparatus 340. Additionally and/or alternatively, one or more safety zones can be defined where the runner apparatus 340 is not permitted to enter, and, if this zone is reached, the runner apparatus stops and reverses its movement.

The runner apparatus 340 can further include one or more processors (also sometimes referred to as the runner processor(s)) and a memory/database. The memory/database can encompass, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory/database can store instructions to cause the one or more processors to execute processes and/or functions associated with the runner apparatus 340 and/or generally with the system 100 such as, for example digital map(s) to guide motion of the runner apparatus 340, configuration settings such as network addresses of the runner apparatus and/or other system components, and/or the like. The one or more runner processors can each (independently) be any suitable processing device configured to run and/or execute a set of instructions or code associated with its runner apparatus 340 and/or the system 100. Each runner processor can be, for example, a general purpose processor, a Field Programmable Gate Array (FPGA), an Application Specific Integrated Circuit (ASIC), a Digital Signal Processor (DSP), and/or the like. The processor(s) and memory/database can be included in a compute device, such as a desktop computer, a laptop computer, a tablet computer, and/or the like, associated with the runner apparatus 340. The runner processor (e.g., the runner processor 410, see FIG. 4) can be further configured to provide an interface (e.g., an Application Programming Interface (API)) for communication with the master server 110 over a wired or wireless network. During typical operation, the runner apparatus 340, with sensors can navigate and move safely around the warehouse. The runner apparatus 340 can receive commands (e.g., wirelessly, via a Wi-Fi network) from the master server 110 to manipulate the boxes, move the boxes between the shelving area(s) and the picker apparatus, and/or the like.

The runner apparatus 340 further includes a lift portion (also sometimes just referred to as a lift) 355 that in turn includes a lift engine 360 (e.g., a servo motor), and a belt 365 (e.g., a rubber belt) that couples the engine 360 to a platform 375 that can hold and support a box 370. FIG. 3B illustrates a platform 375' that differs from that in FIG. 3A by having a side wall 376 that includes outward-sloping portions 378 to better accommodate a box as it is received by the platform 375, such that the box slides into a desired position on the platform when pulled onto the platform, as explained below.

The platform 375 includes a mechanical coupling mechanism such as a set of vacuum/suction cups 380 and a vacuum generator/pump (not shown) couplable to the box 370. The platform 375 further includes a push-pull mechanism/unit 385 coupled to the vacuum cups 380, such as, for example, a vertical plate that is coupled to the vacuum cups and is controllably movable along the direction A-A' on tracks formed on the platform 375. It is understood that any other suitable coupling mechanism can be employed such as, for example, a set of hooks that engage with corresponding rings on the boxes. Use of the suction cups 380 and the push-pull unit 385 collectively affect loading and unloading of the box 370 from a shelf along the direction A-A'. Generally, the box 370 can be stored on the shelf such that the longest dimension of the box is along the depth of the shelf, permitting loading and unloading along another shorter dimension of the box. It is understood that any side of the box, and correspondingly, another direction (other than A-A') can be used for loading and unloading of the box 370.

Specifically, during loading, the suction cups 380 can be mechanically coupled to the box 370 on the shelf via operation of the vacuum pump of the runner apparatus 340. Then, the push-pull unit 385 can be activated to pull the box 370 onto the platform 375. During unloading, the push-pull unit 385 can be activated to push the box 370 off the platform 375 and onto a shelf. The suction cups 380 can remain activated to remain mechanically coupled to the box 370 once it is loaded onto the platform 375, or be inactivated thereafter. The lift engine 360 and belt 365 can collectively effect moving the platform 375 to different heights, such that boxes can be uploaded from and loaded onto the platform from shelves at different heights.

Any box described herein can be, for example, a plastic, non-collapsible, non-stackable Euro containers (KLT box) of dimensions 40×30×22 cm (depth×width×height), with smooth walls and no holes. This can aid in the vacuum cups 380 firmly attaching to the box 370 to creating a vacuum sealed hold, and pull it towards the runner apparatus 340 and onto the platform 375.

Industrial shelves can be used to store the boxes that are retrieved and then returned by the runner apparatus. For example, each shelf can include a rack having a depth of 40 cm, height of 25 cm, and width of 70 cm. In this manner, two KLT boxes of 30 cm depth can be placed in each rack, and provide some additional space to account for any impression during box loading/unloading.

The runner processor is further configured to use a digital map of the environment (e.g., the warehouse) to approximate its position. For example, in some cases, in a system with multiple runner apparatuses, a singer runner apparatus can be employed to map out the entire warehouse/environment, and the same map can be distributed to other runner apparatuses for use in mapping (e.g., by the master server 110). In other cases, each runner apparatus can be configured to generate its own map, update its own map (e.g., in real time), and/or transmit updates to the map (e.g., in real time) as it traverses the warehouse during routine operation. In this manner, each runner apparatus can update the global digital map for others based on changes to the warehouse configuration (e.g., movement of furniture).

Figure 9A:
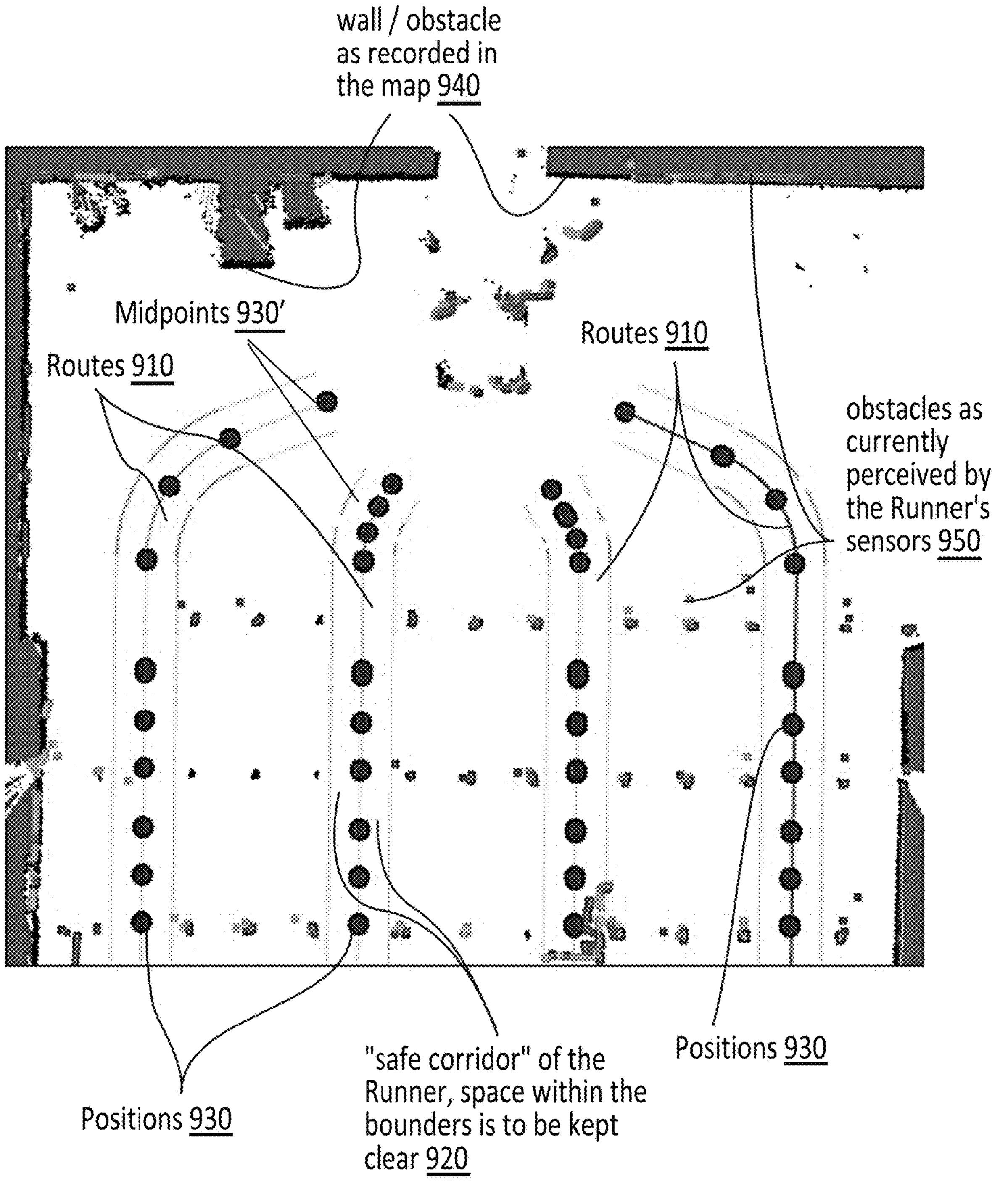
FIG. 9A illustrates an example map of movement of runner apparatuses with routes that do not intersect.
Figure 9B:
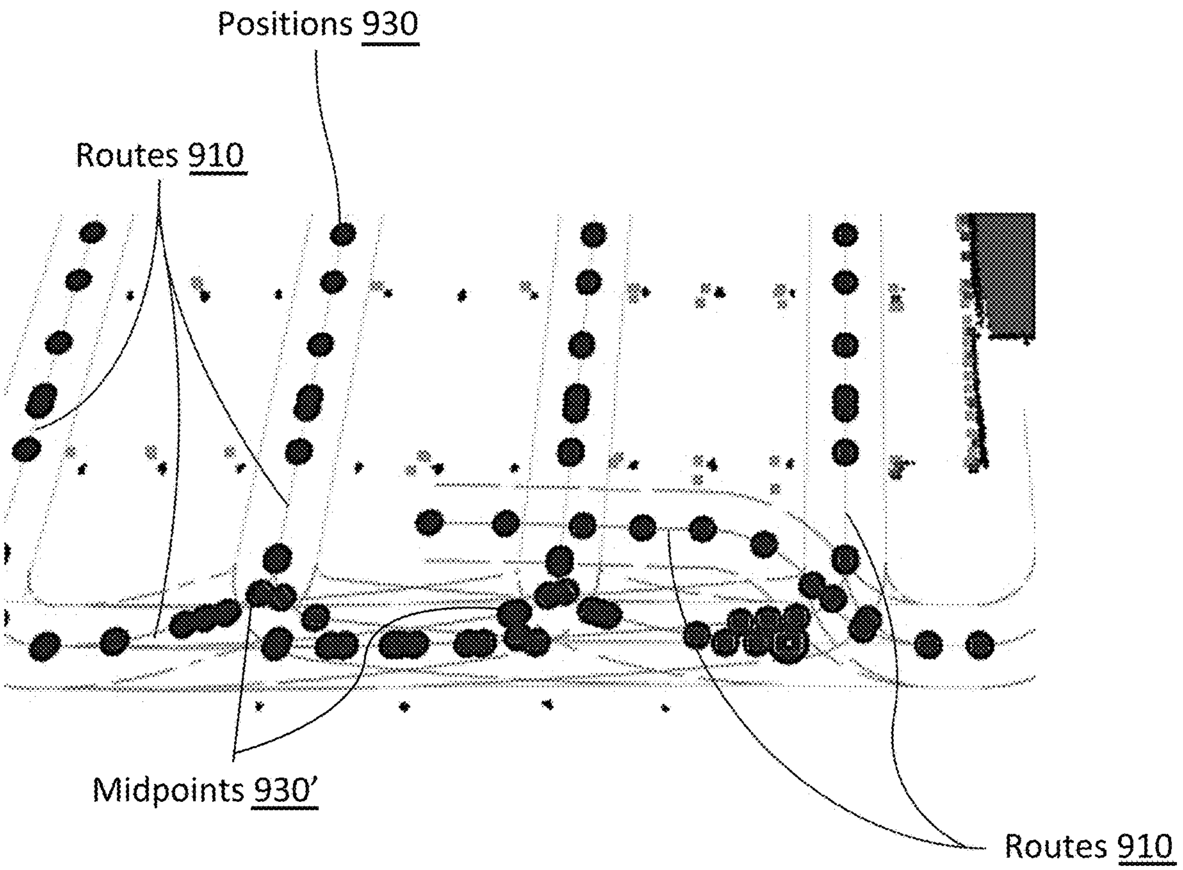
FIG. 9B illustrates another example map of movement of runner apparatuses with some intersecting routes.

More generally, in some cases, the runner processor can use any suitable simultaneous localization and mapping (SLAM) approach of constructing and updating its digital map. In some cases, no statis indication of position information (e.g., magnetic tracks, optical codes, and/or the like) are employed. In some cases, the updating of the digital map can be dynamic and substantially in real time. Briefly, the runner apparatus 340 can be configured to read its wheel-coupled odometry sensors to determine its approximate position, though it is understood that other tracking techniques (e.g., spatial tracker devices, magnetic tracking tape, optical marks, etc.) can be employed. Then, using cameras and/or other sensors, it can scan its surroundings to locate known landmarks, objects, and/or surfaces expected to be seen at this position. If the landmark is closer or farther than expected, it uses that information to adjust its approximate position. SLAM approaches can also be used to update that runner apparatus' map. For example, if the runner apparatus encounters a new (previously unseen) landmark, or an old/known landmark (previously detected) is not detected, but a sufficient/threshold number of other old landmarks are detected, that particular landmark is added or removed, respectively. The combination of odometry and sensor-based approaches can result in more precise position approximation for a given runner apparatus. Example maps are illustrated in FIGS. 9A, 9B, which illustrate route 910 within physical (e.g., between shelfs) or otherwise-indicated corridors 920 within which runner apparatuses can move. FIGS. 9A, 9B also indicate positions 930 that can represent designated (e.g., by the master server) stopping locations for loading and unloading boxes, a midpoint to create a curve that the runner apparatus can move on, and/or the like. Also illustrates are map-recorded features such as walls and other obstacles. As explained herein, runner apparatuses can detect (e.g., via 3D sensors) additional features that may not be within their digital maps, and these are indicated as currently perceived obstacles 950 that may or may not be added to the runner apparatus' digital map.

During operation, the runner apparatus 340 can follow a series of commands/instructions from the master server 110 which can include, for example, a desired target location where to move (target location and orientation), and where to put a particular box, from where to take the box (including height of the box), and/or the like. The commands/instructions can sometimes define a waiting time such as, for example, a time period in which the runner apparatus 340 moves to, and couples to, a charging station within the warehouse and stays in place to recharge. In some cases, the commands/instructions can also define optional midpoint(s) of a desired route for the runner apparatus to yield a faster route, and/or a route that produces a more predictable behavior. For example, if there is an obstacle on the route and the runner apparatus 340 moves too close to the obstacle due to imprecision in positioning or localization, it would eventually stop, withdraw/reverse, and ultimately correct its position, which can be time consuming. However, if a midpoint has been previously defined that in turn defines a curve with a large diameter that would circumvent the obstacle, the runner apparatus can use that curved route to just move around the obstacle instead. Midpoints can also be useful for avoiding potential crossings where routes of two or more runner apparatuses intersect. In such cases, since there is some probability of multiple runner apparatuses being at that intersection at the same time, the use of midpoints can be used for maneuvering in those circumstances. Some example midpoints 930' are illustrated in FIGS. 9A, 9B.

In some cases, the commands/instructions can also define speed and/or acceleration of the runner apparatus on different parts of its prescribed route. This can provide for safer and smoother movement such as, for example, when rounding a curve or corner where it is desirable to slow down to avoid tipping of the runner apparatus, to prevent any box the runner apparatus is carrying from falling off its platform, to prevent items from falling out of the box due to inertia, and/or the like.

Figure 4:
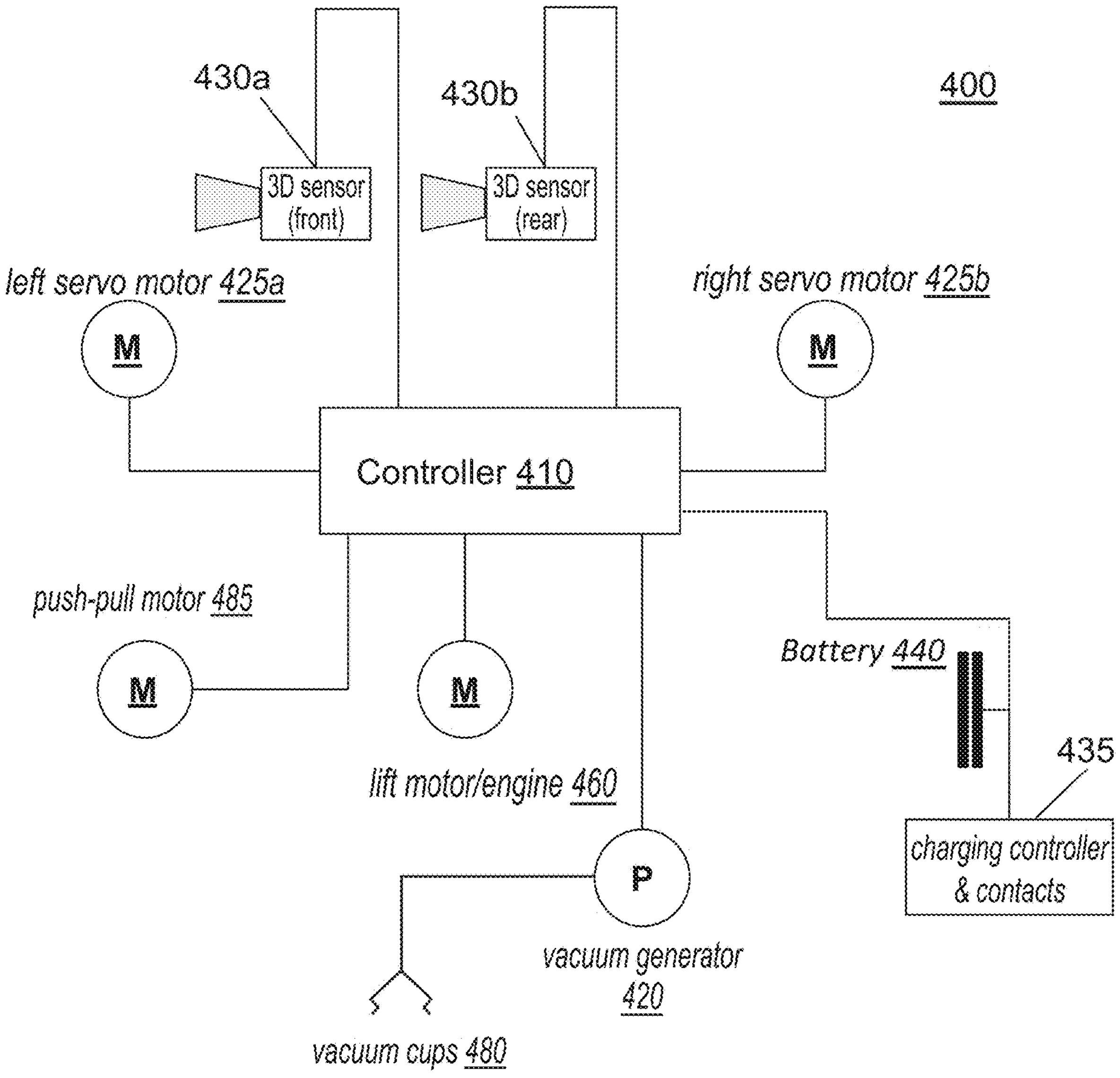
FIG. 4 illustrates example electrical/electronic components of the runner apparatus of FIGS. 3A-3C.

FIG. 4 illustrates an example circuit 400 of electrical and electronic components of the runner apparatus 340. A runner processor/controller 410 is communicably coupled to the lift engine 460 to control up-and-down motion of the platform 375. The runner processor 410 is also communicably coupled to the push-pull motor 485 (which can be similar to the push-pull unit 385) to control the unloading/pushing off of boxes from the platform, and to control the loading/pulling on of boxes onto the platform. The runner processor 410 is also communicably coupled to servo motors 425*a*, 425*b* to control movement of the runner apparatus 340. The runner processor 410 is further communicably coupled to sensors 430*a*, 430*b* (illustrated here as example 3D sensors, such as 3D cameras) to monitor/visualize the environment of the runner apparatus 340 for navigation, safety, etc. as described herein. The runner processor 410 is further communicably coupled to a rechargeable battery 440 via contacts 435, which can also encompass a separate charging processor/controller as illustrated. A separate charging processor can be beneficial for being specifically configured to control the charging current, to communicate with the server 110 to provide feedback about the charging process, and/or the like.

FIG. 6A illustrate several, non-limiting, example functional aspects of the runner apparatus 340 as described herein, and others. For example, FIG. 6A illustrates that the runner processor can execute picking functionality for navigation such as SLAM-based localization of the runner apparatus' location, and path planning for movement of the runner apparatus such as based on a digital map as described herein. FIG. 6A illustrates that the runner processor can execute braking functionality if it detects (e.g., via the sensors 430*a*, 430*b*) that someone or something is in a safety zone (e.g., a rounded box of a predetermined size around the runner apparatus) of that runner apparatus. FIG. 6A illustrates that the runner processor can execute API functionality to communicate with other members of the fleet such as to exchange map information, provide an indication of success or failure for any of its operations, that runner apparatus' calculated position, battery/charge level, diagnostic information, maintenance information, and/or the like.

Master Server and Order Fulfillment

Referring again to FIG. 1, the master server 110 can include one or more processors 115 (also sometimes referred to as the master processor(s), and/or the like) and a memory/database. The memory/database can encompass, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory/database can store instructions to cause the one or more processors to execute processes and/or functions associated with the master server 110 and/or generally with the system 100. The one or more processors 115 can each (independently) be any suitable processing device configured to run and/or execute a set of instructions or code associated with the master server 110 and/or the system 100. Each master processor 115 can be, for example, a general purpose processor, a Field Programmable Gate Array (FPGA), an Application Specific Integrated Circuit (ASIC), a Digital Signal Processor (DSP), and/or the like. The processor(s) 115 and memory/database can be included in a compute device, such as a desktop computer, a laptop computer, a tablet computer, and/or the like, associated with the master server 110. The master processor 115 can be further configured to provide an interface (e.g., an Application Programming Interface (API)) for communicable coupling with the picker apparatuses 135, with the runner apparatuses 140*a*-140*n*, and with a warehouse management system WMS over a wired or wireless network. As illustrated in FIGS. 1 and 6A, the master processor 115 can generally execute at least two modules—core module 120*a* executing instructions to control operation of the master server 110 such as interfacing with the WMS, and a fleet module 120*b* executing instructions to control operation of the runner apparatuses and the picker apparatuses.

The functionality of the master processor 115 can include, but is not limited to, keeping track of item information including the count of items in each box in the warehouse, the position of each box (e.g., shelf position, height), (optional) a unique identifier assigned to each box, a stock keeping unit (SKU) code of the items in each box (or in the compartments of a box), the best-before date of each type of item, and/or the like. The master processor 115 can be further configured to, via API calls, instructing the picker apparatus(es) and the runner apparatus(es) to execute commands as described above.

The master processor 115 is further configured to communicate with the ordering system WMS to retrieve customer orders. Each order can include, for example, a listing of the type of items, and a number of units or quantity for each item. The master processor 115 can be further configured to generate and transmit, in the appropriate sequence, commands to the picker apparatus(es) and the runner apparatus(es) to fulfill the order such as, for example, command(s) to the runner apparatus to retrieve a specific box from shelves and to bring them near the picker apparatus, followed by command(s) to the picker apparatus to move the item(s) from the retrieved box to a destination box, followed by command(s) to the runner apparatus to place the retrieved box back in its original location or another location. The master processor 115 can also keep track of inventory/item information and when supply dwindles, also request the system WMS and/or another device (not shown) for replenishment of items when necessary. The master processor 115 can further be configured to monitor the status and/or health of the runner apparatus(es) and picker apparatus(es); for example, the runner apparatus(es) and picker apparatus(es) can provide an indication of success or failure for any operation (e.g., a runner apparatus successfully retrieving a box, a picker apparatus unsuccessfully picking up an item), position information provided by the runner apparatus(es), battery/charge level information provided by the runner apparatus(es), and/or the like. A remote and/or on-site user of the master server 110 can further execute ad-hoc commands via the master processor 115 such as, for example, modify item information, change the digital map of the warehouse being used by the picker apparatus(es).

During order fulfillment, the master processor 115 is configured to generate and transmit instructions for the movement of the runner apparatuses 140*a*-140*n* to retrieve and bring order-related items to the picker apparatus(es) 135. Explained hereon with respect to one segment (i.e., one picker apparatus 135 and associated runners 140*a*-140*n*) for simplicity, the master processor 115 can further monitor operation of the picker apparatus(es) 135 such as, for example, the success/failure of loading or unloading a box. The master processor 115 is also configured to generate and transmit instructions to the picker apparatus for picking the correct items, in the correct quantities, from the picker apparatus(es) 135 as they are retrieved and brought to the picker apparatus. The master processor 115 is also configured to monitor execution of each pick process such as, for example, to determine whether that pick attempt was a success or a failure. For example, the master processor 115 can receive an indication of success of a pick attempt, update its item information to indicate that the box associated with that pick attempt has one fewer item, and update its order information to indicate that item as being successfully picked.

Generally, the master server 110 can affect the transfer of a particular item from a storage locations/boxes to a target box/location by selecting and instructing the runner apparatus to retrieve the desired box from the storage location (e.g., to retrieve a box from the sixth shelf, second level) and to move to a position proximate to the robotic arm of the picker apparatus. The master server 110 can select the runner apparatus by, for example, first identifying a box containing a requested item. In some cases, e.g., when multiple boxes include the requested item, the box can be selected based on expiration date, with the selected box having the requested item that is expiring the soonest. Once the box is selected, a runner apparatus is selected that may be assigned to the row, corridor, and/or some predetermined area of the warehouse in which that box resides. Assignment of runner apparatuses to separate areas/rows/corridors minimizes the potential for collisions between the runner apparatuses and simplifies runner apparatus selection. In some cases, when the selected box is accessible to multiple runner apparatuses, the runner apparatus that is closest to the selected box, and not currently occupied retrieving or returning another box, can be selected to retrieve the target box and move it to near the picker apparatus.

The master server 110 can then instruct the picker apparatus to, via the robot arm of the picker apparatus, pick the requested number of items (and retry in case of failures) from the retrieved box. In some cases, the instructions to the picker apparatus can include a specification of the item to be picked so that, when the picker apparatus includes multiple vacuum cups of varying sizes and/or vacuum strength, it can select which vacuum cup to use to pick the item. Once the pick process is complete, the master server 110 can instruct that runner apparatus to return the retrieved box to its storage location. In some cases, the master server 110 can instruct that runner apparatus to return the retrieved box to a different location from its original storage location.

For example, the master server 110 can instruct the runner apparatus to move a box containing a relatively more frequently requested item within a predetermined time window (e.g., last 6 hours) than another to a position which is closer to the picker than another box that contains the relatively less frequently requested item. This can save time in the near and long-term since closer locations are faster to retrieve from for presentation of that box to the picker apparatus. As another example, the master server 110 can instruct the runner apparatus to move the box, if it is empty or the quantity of items in the box falls below a predetermined threshold, to a refill area/location for manual or automated replenishment. As yet another example, the master server 110 can instruct the runner apparatus to move the box to a "safe" zone, shelf, location and/or space so that a human operator can remove, replace, manipulate, and/or inspect the content of the box. In some cases, the boxes in at least some of the shelves can be accessed by runner apparatuses from one side of the shelf and by the human operator from the other side of the shelf, so that the operator does not have to enter the area where the runner apparatus are operating. Another benefit of such a setup is that instead of manipulating the contents of the box, the operator can replace the box with another box, can remove the box, can place a new box in an empty shelf slot to be later retrieved by a runner apparatus, and/or the like. In some cases, the operator can enter or update details on the master server 110 about any box (e.g., a newly placed box) and/or its contents, for example by scanning the barcode of the items, scanning the barcode of the box, entering the count of the items, entering the best-before date of the items in the box, and/or the like. This is made possible by the master server 110 keeping track of boxes, their locations, and the items within the boxes, including the quantity of items.

This process of box retrieval and return can be repeated, in a mutually exclusive (e.g., one item is retrieved, picked, and its corresponding box placed back at a time) or overlapping manner (e.g., multiple runner apparatuses are simultaneously controlled to retrieve boxes, present them to the picker apparatus, and return them to storage) for other items. Said another way, other items/boxes associated with the order can be brought by different runner apparatuses to the picker apparatus. The robotic arm of the picker apparatus can pick from and to multiple locations, so can pick from a different box, and/or place the items into a different box immediately after it finishes one pick. In some cases, when the picker apparatus includes multiple robotic arms with each arm having its own vacuum cup, the robotic arms can work simultaneously. The end result is a target box filled with multiple items, in the requested quantities per the order.

Accordingly, FIG. 10 illustrates an example setup and operation of the arm 240 and cup/gripper 245 of a picker apparatus engaging with a box 370 retrieved and presented by a runner apparatus 340. FIG. 10 also shows a conveyor sorting apparatus 1010 that can be used by the picker apparatus to fulfill multiple orders at the same time. In the example setup of FIG. 10, a 3D scanner camera 510 is coupled to the sorting apparatus 1010 for working singularly or in concert with the picker apparatus to perform object recognition of the items in the box 370 as described herein.

Figure 11A:
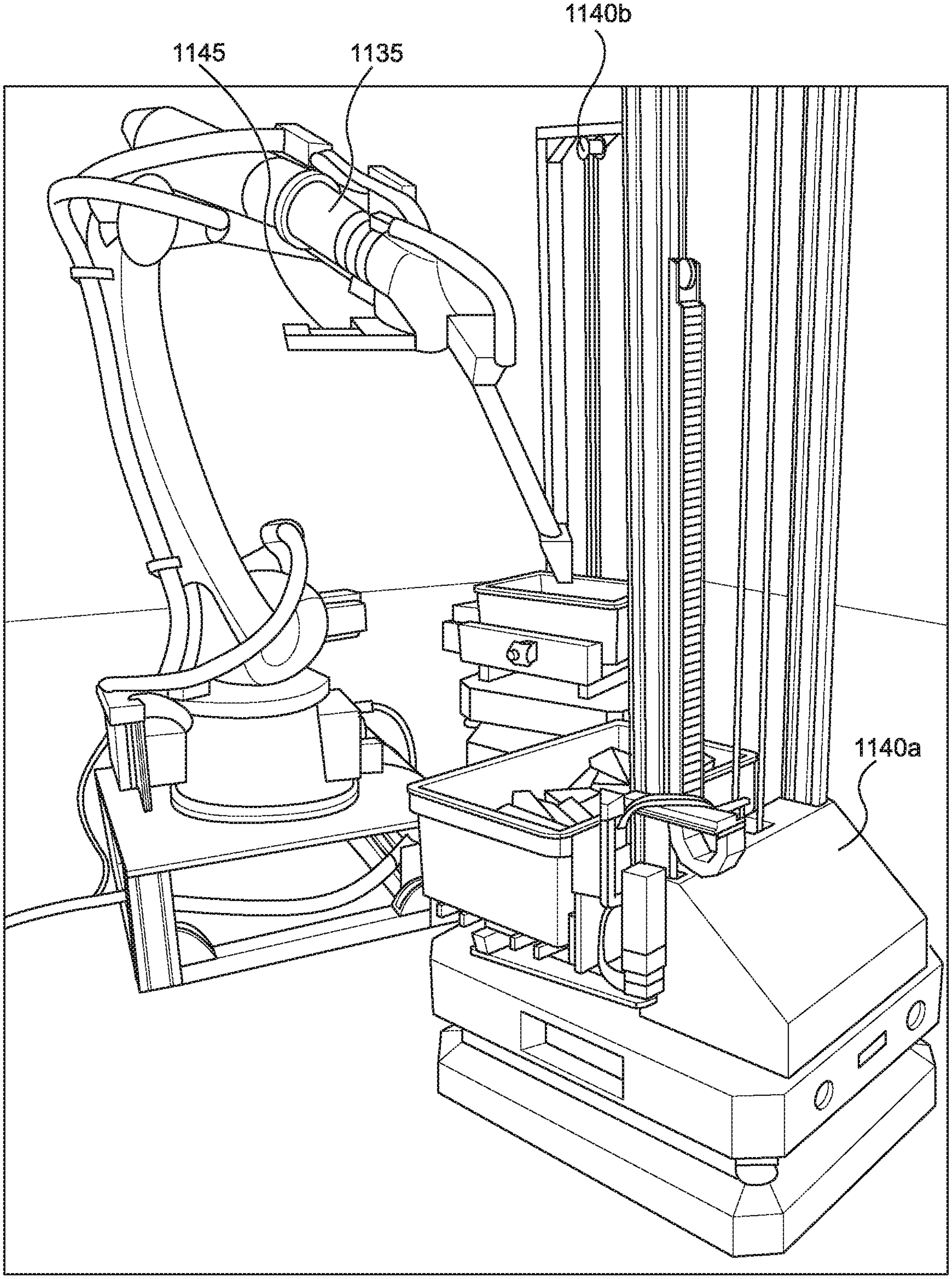
FIGS. 11A-11D are images showing example operation of a picker apparatus sequentially interacting with multiple runner apparatuses towards fulfillment of an order.
Figure 11B:
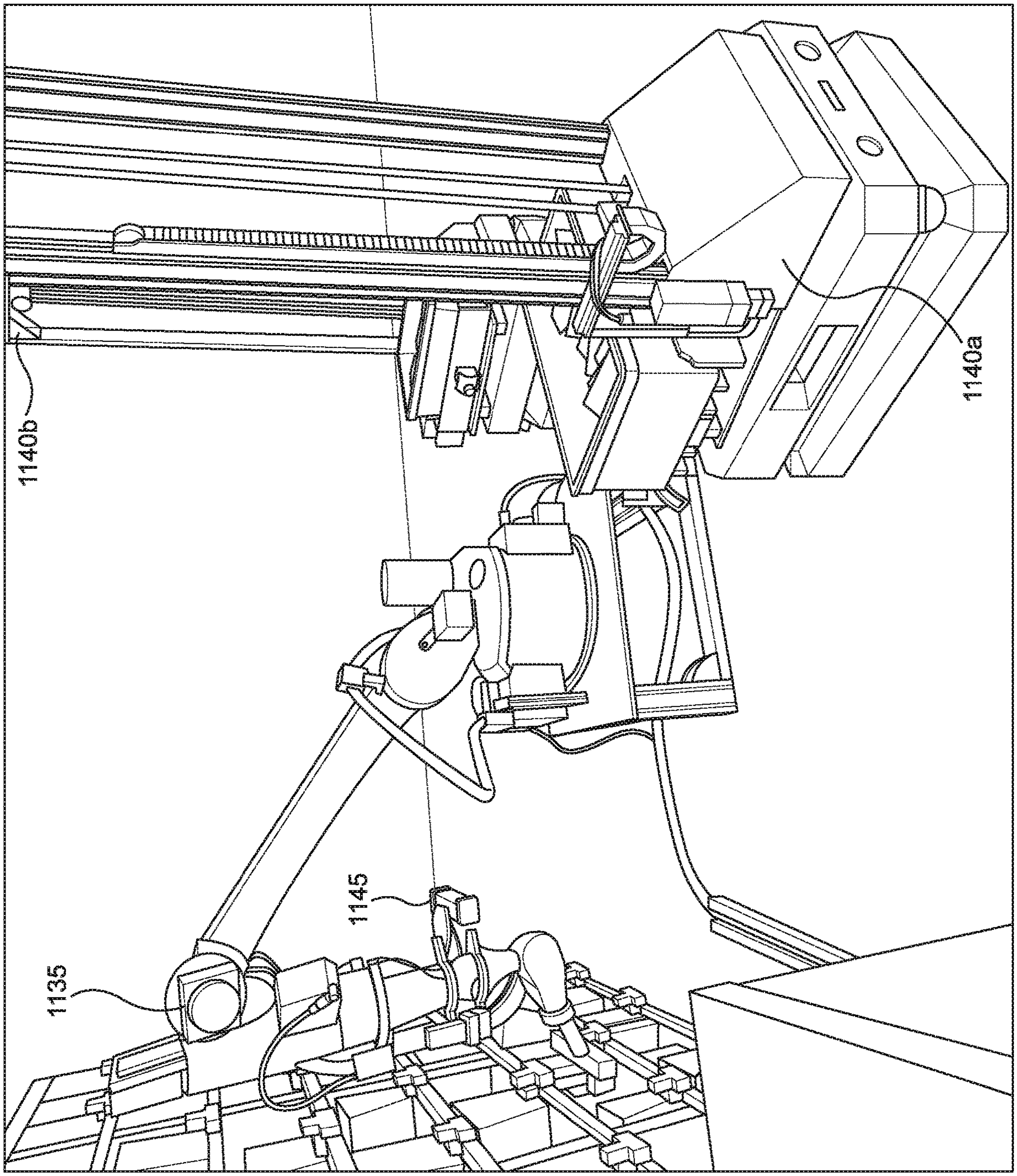
Figure 11C:
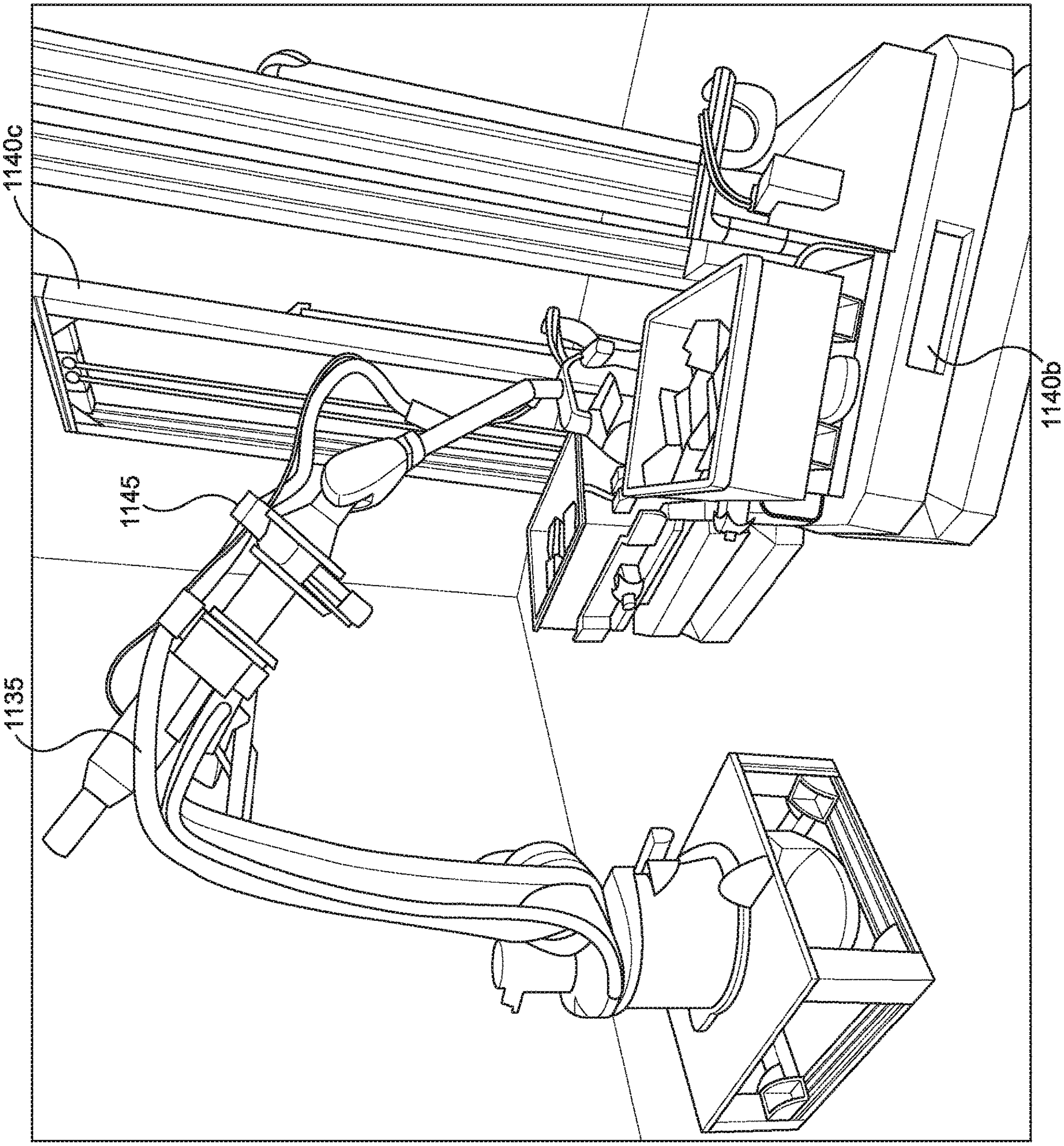
Figure 11D:
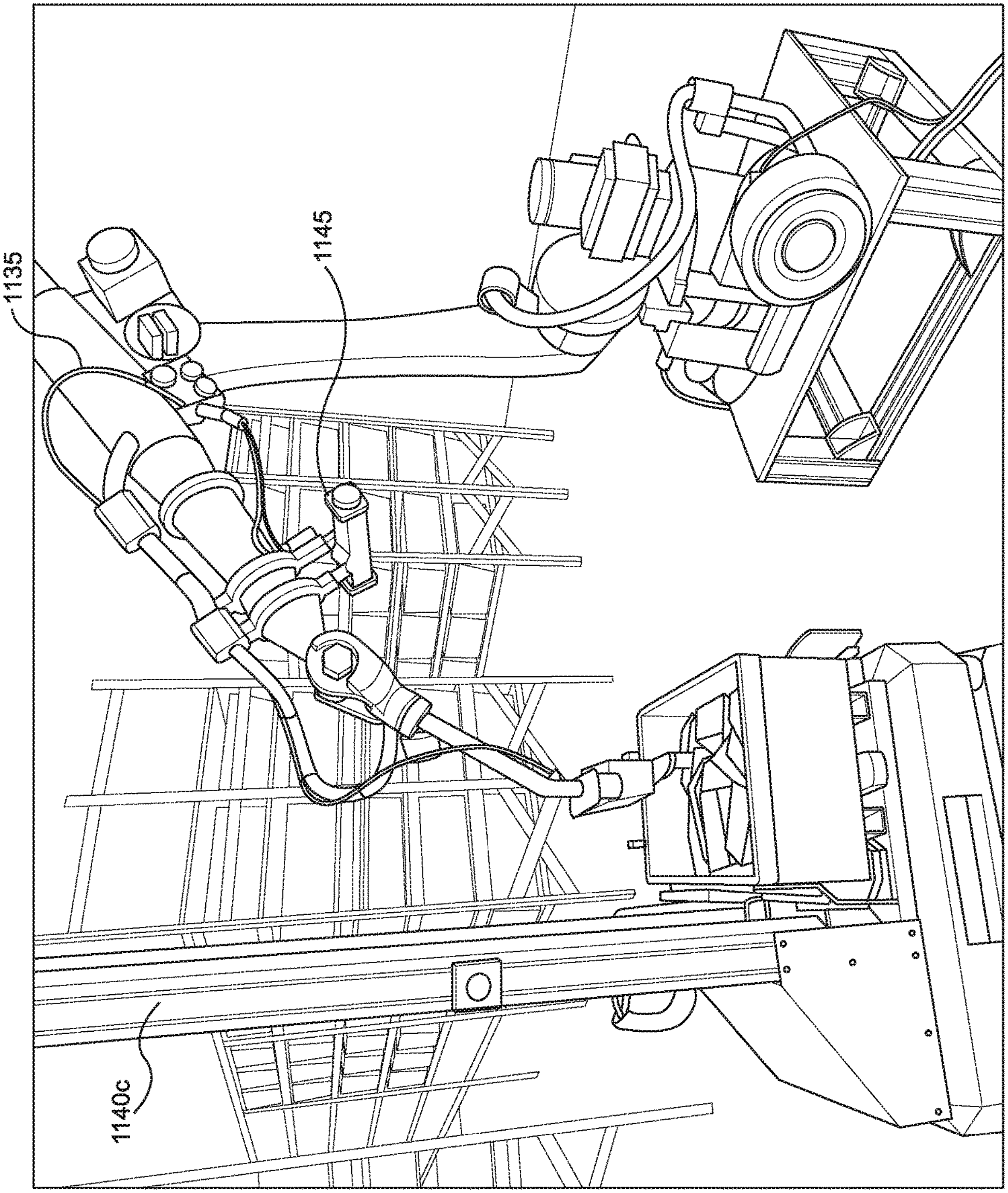

FIGS. 11A-11D are images showing operation of a picker apparatus 1135 with various runner apparatuses 1140. FIG. 11A shows the picker apparatus 1135 picking an item from a box held by the runner apparatus 1140*a*, while another runner apparatus 1140*b* awaits picking. FIG. 11B illustrates the picker apparatus 1135 placing the item in its designated destination box. FIG. 11C illustrates that the picker apparatus 1135 is picking the next item from the runner apparatus 1140*b*. At this time, the runner apparatus 1140*a* has retreated, and another runner apparatus 1140*c* has arrived that awaits picking. FIG. 11D illustrates that the runner apparatus 1140*b* has retreated, and now the picker apparatus 1135 is picking the next item from the runner apparatus 1140*c*. FIGS. 11A-11D each also illustrate a camera/3D scanner 1145 mounted in proximity to the robot arm for image-based recognition of the items in the box(es).

In some cases, the master server 110 can be configured to control operation of the runner apparatuses and the picker apparatus to make the order fulfillment and picking process more efficient. As an example, the master server 115 can employ different strategies of order picking including, but not limited to regular order picking, wave picking, traditional batch picking, single SKU batch picking, fulfilment batch picking, combinations thereof, and/or the like. In some cases, the picking strategy can be switched during times of day, and/or during different loads (e.g., number of ordering being fulfilled) in order to improve one or more metrics such as, but not limited to, order latency, total throughput, energy consumption, and/or the like. For example, say the number of orders is typically highest around midday. At the same time, all delivery slots for the orders (e.g., deliveries that can be scheduled by customers, say at 15 minute intervals) are usually already taken. Accordingly, it can be preferable at that time to process orders in batches, grouped by common items. Accordingly, a runner apparatus can present a box with items of the same type to the picker apparatus, which then satisfies all orders with the same type of item. Accordingly, for a given box retrieved and presented by the runner apparatus for picking, more orders are satisfied, and the throughput is higher. Conversely, grouping orders in this manner for batch picking can increase latency for orders with a less common item, and those orders are acted upon only when another order with that same, less common, item is received.

Now say that, towards the evening, incoming orders are less frequent, and earlier delivery slots are becoming available. The master server 110 can now switch to acting on orders where some items are to be brought exclusively for one order. There is now a slight decrease in efficiency, since fulfilling these orders requires more cycles of box retrieval and return per order by the runner apparatuses. In some cases, the master server 110 can be configured to pick orders sequentially, in the sequence that they are received, with low latency but a greater number of round trips made by the runner apparatuses. As another example, between midnight and early morning, there may be very few orders coming, so the master server 110 can be configured, during this period, to charge all but one or a few runner apparatuses, and use the one/few runner apparatus(es) to service the few incoming orders.

In some cases, the master server 110 can be configured to plan the routes for the runner apparatuses so that they can move around the warehouse with minimum conflicts. Even when runner apparatuses have safety features (e.g., sensors) to prevent collisions, such interactions can nevertheless lead to slowdowns. With the master server 110 planning the movements of the runner apparatuses, typical locations such as crossroads, other frequented locations can be avoided, resulting in prevention or mitigation of deadlocks and/or live-locks. In some cases, the master server 110 can generate the routes automatically from the known digital map (e.g., as generated by a designed runner apparatus), and in some cases, the routes can be defined and/or customized by a user of the master server 110.

FIGS. 6A, 6B illustrate several, non-limiting, example functional and hardware aspects of the master server 110 as described herein, and others. For example, FIG. 6A illustrates that the master processor can execute core functionality (e.g., via the core module 120*a*) to manage database information such as item/box/shelf information as described herein, to schedule tasks and synchronize with the WMS and/or other systems such as an ordering system, and to generally interface with the WMS and/or other systems. FIG. 6A also illustrates that the master processor can execute fleet functionality such as managing the paths/trajectories taken by the runner apparatuses, managing other operations of the runner apparatuses such as scheduling of charging time, and synchronization between runner apparatuses such as for use of specific charging stations, for exclusive use of any given position around a picker apparatus, and/or the like. FIG. 6A also illustrates that the master processor can execute one or more interfaces such as a replenishment interface to manage replenishment of items, a picker interface to manage operation of the picker apparatus, and an administrative interface to permit a user to manage any operation of the master server 110 such as adjusting inventory, modifying a digital map of the warehouse, etc.

Similarly, FIG. 6B illustrates that the master server 110 can include a computing device (e.g., that encompasses the master processor 115), a mesh Wi-Fi device/system for wirelessly communicating with the runner apparatuses and the picker apparatuses, and an interface such as a touch-screen for administrative use.

Box and Shelf Specifications

In some cases, one box contains only one SKU, i.e., one type of item. This can be beneficial for speeding up the picking process and making it more predictable, since the neural network (employed by the picker apparatus) to facilitate picking does not have to recognize different types of items, i.e., during picking, the runner apparatus does not need to scan the barcodes to identify items. In some cases, all items in a box also have the same best-before date.

In some cases, some or all boxes can be divided into compartments, such as into two halves, four quarters, unequal-sized/shaped compartments, and/or the like. This makes it possible to store multiple SKUs in one box but separated into different compartments. The master server 110 can keep track of the number and location of each compartment and their corresponding content. The master server 110 can further, when instructing the picker apparatus, include instructions to pick from/to a specific compartment of the box.

In some cases, the shelves used to store boxes are standardized, e.g., substantially identical Similarly, the boxes can be of the same type and of standardized dimension, weight, allowed load and material such as, for example, an industrial stacking container such as a “Euro container” conforming to the VDA 4500 standard, a “milk crate” conforming tit e Motion Picture Industry Standard, and/or the like.

Charger/Charging Station

The system 100 can include, encompass, or interface with one or more charging stations placed at known, defined locations around the warehouse for charging the runner apparatuses. The master server 110 can monitor the charging status of the runner apparatuses (e.g., based on battery status, charge level, and/or other battery-related information received from each runner apparatus), and instruct any runner apparatus to move to a designated charging location to charge a rechargeable battery of that runner apparatus. Generally, any suitable charging strategy can be independently applied for each runner apparatuses such as, off-peak, when-needed, and/or the like.

As an example, some runner apparatuses can employ a lead-acid battery, and it may be preferable to deep-cycle its re-charging, i.e., permit the batter to substantially fully discharge, and then fully recharge the battery, which can take some time that is not desirable during business hours. In such cases, the master server 110 can be configured to affect charging of that runner apparatus during off-peak hour, during evening hours, overnight, and/or the like.

As another example, some runner apparatuses can employ batteries that are relatively agnostic to partial charge-discharge. In such cases, the master server 110 can be configured to recharge all runner apparatuses with battery levels below a predetermined threshold before peak/busy hours of operation.

As another example, some runner apparatuses can employ lower capacity batteries such as, for example, super-capacitor based batteries, that nevertheless recharge rapidly. In such cases, the master server 110 can be configured to charge them during box presentation, i.e., at a charging station near the Picker apparatus. Said another way, the runner apparatus can get recharged every few runs.

Example Warehouse Setup

Figure 8:
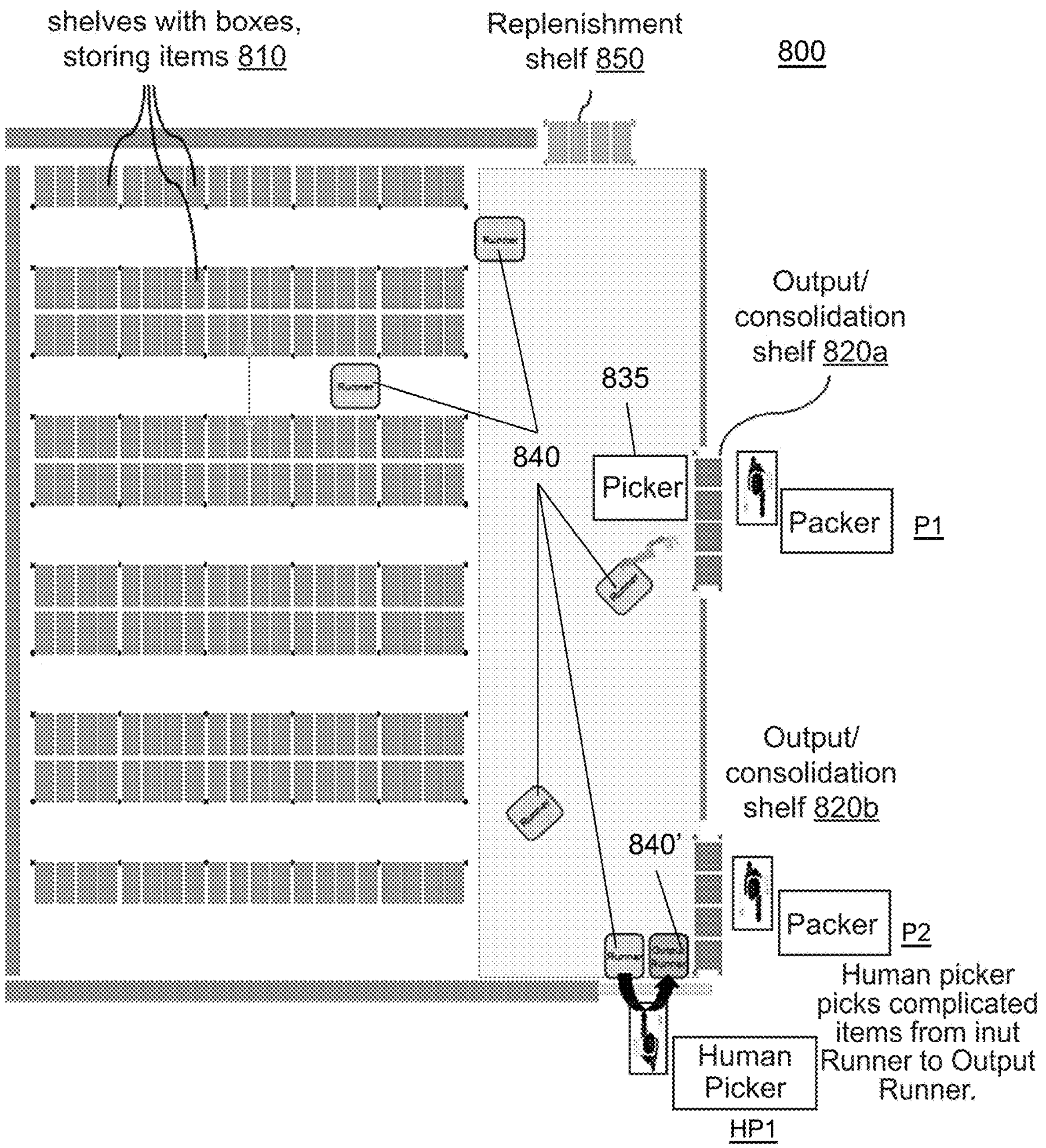
FIG. 8 illustrates an example layout of a warehouse, and further illustrates the components of the system of FIG. 1 and other components, including multiple runner apparatuses, a picker apparatus, a human/user picking station, a consolidation shelf, and a replenishment shelf.

FIG. 8 illustrates an example warehouse setup 800 within which aspect of the system 100 can be deployed. FIG. 8 illustrates the setup 800 as including a single picker apparatus 835 and multiple runner apparatuses 840. The runner apparatuses can move boxes storing items from shelves (collectively, reference number 810) to the picker apparatus 835 for picking into various orders being compiled on an output/consolidation shelf 820*a*. A human packer P1 can manage the contents of the shelf 820*a* from the other side. FIG. 8 also illustrates how, for items that may be too bulky, fragile, and/or otherwise unmanageable or un-pickable by the picker apparatus 835, a human picker HP1 can interface with runner apparatus(es) 840 holding boxes with such items and manually sort them onto a designated output runner 840', which in turn can manage boxes of orders being fulfilled on another shelf 820*b*. Said another way, the human picker HP1 replaces the automated picker apparatus 835 in this setup. Another human packer P2 can then manage the contents of the shelf 820*b*. The packers P1, P2 and the human picker HP1 all operate from outside the walls of the warehouse for safety purposes. FIG. 8 also illustrates a replenishment shelf 850, where the runner apparatuses 840 can move boxes to when the number of items in the box, or within a compartment of the box, is zero or below some threshold number.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for fulfillment of an order including a set of items disposed in a set of boxes, the boxes being disposed on a set of shelves, the method comprising:

a) receiving, at a master server, a specification of the order including the set of items;

b) generating, at the master server, a set of commands for fulfillment of the order;

for each item of the set of items:

c) selecting a runner apparatus of a set of runner apparatuses as a first runner apparatus;

d) transmitting, by the master server to the first runner apparatus, a first command to retrieve a first box of the set of boxes for presentation to a picker apparatus, the first box having disposed therein a set of identical instances of that item;

e) retrieving, by the first runner apparatus and subject to the first command, the first box by:

moving to a location proximate to the first box;

via a lift of the first runner apparatus, moving a platform of the first runner apparatus to the same height as the first box;

drawing the first box off its associated shelf of the set of shelves and onto the platform;

f) presenting, by the first runner apparatus, the first box to the picker apparatus by:

moving to a location proximate to the picker apparatus, wherein the picker apparatus includes a base portion that is immovable; and via the lift, moving the platform holding the first box to a predetermined height for access by the picker apparatus;

g) transmitting, by the master server the picker apparatus, a second command to sort that item from the first box to a destination box;

h) picking, by the picker apparatus and subject to the second command, that item by:

imaging at least a portion of an interior of the first box to identify and select an instance of that item from the set of items as a selected item, wherein imaging the portion of the interior of the first box comprises:

acquiring image and/or video data of the portion of the interior of the first box with an imaging device of the picker apparatus; and applying a convolutional neural network to the image and/or video data to identify at least some of the set of items;

identifying a pick point of the selected item; and via a robot arm of the picker apparatus, engaging with the identified pick point of the selected item to pick the selected item out of the first box;

i) moving, by the picker apparatus, the selected item to the destination box by:

translocating the robot arm holding the selected item along a predetermined trajectory towards the destination box; and releasing the selected item into the destination box.

2. The method of claim 1, the drawing the first box off its associated shelf further including:

engaging a suction mechanism of the platform with the first box to form a gripping hold between the platform and the first box; and via a push-pull mechanism of the first runner apparatus, pulling the first box off its associated shelf and onto the platform.

3. The method of claim 1, the identifying the pick point further comprising:

identifying a set of pick points on the selected item; and selecting, a first pick point of the set of pick points as the identified pick point.

4. The method of claim 1, wherein the robot arm includes a vacuum cup for picking the item, the picking the item further including, after engaging with the identified pick point:

detecting a pressure within the vacuum cup;

detect a flow rate within the vacuum cup; and determining that the item was successfully picked when the ratio of the detected pressure to the detected flow rate exceeds a predetermined threshold.

5. The method of claim 1, engaging with the identified pick point of the selected item further including:

applying suction pressure to a vacuum cup associated with the robot arm; and engaging the vacuum cup with the identified pick point of the selected item to create a vacuum-sealed grip between the vacuum cup and the selected item.

6. The method of claim 1, the picking, by the picker apparatus and subject to the second command, that item further including:

j) generating, in a randomized manner, a spatial trajectory for movement of the robot arm untaken to pick that item as the selected item and to move the selected item to the destination box;

k) analyzing that spatial trajectory to identify any collisions of the robot arm with its environment;

l) if no collisions are identified at step (k), deeming that spatial trajectory as the predetermined trajectory; and m) if a collision is identified, repeating steps (j)-(m).

7. The method of claim 6, step (j) further including generating a polyhedral representation of the robot arm and of its environment, and step (k) further including identifying a collision between the robot arm and its environment when the polyhedral representation of the robot arm spatially overlaps with the polyhedral representation of its environment at any point on that trajectory.

8. The method of claim 1, further comprising executing steps (c)-(i) for two or more items of the set of items in an overlapping manner.

9. The method of claim 1, wherein the order is a first order, the picker apparatus is first picker apparatus, and the set of runner apparatuses is a first set of runner apparatuses, such that the first picker apparatus and the first set of runner apparatuses constitute a first segment, further comprising:

receiving, at the master server, a specification of a second order including the set of items;

repeating steps (b)-(i) for the second order with a second segment including a second picker apparatus and a second set of runner apparatuses.

10. A system for fulfillment of an order including a set of items disposed in a set of boxes, the boxes being disposed on a set of shelves, the system comprising:

a set of runner apparatuses, each runner apparatus of the set of runner apparatuses including:

a platform for holding a box; and a lift coupled to the platform for vertical translocation of the platform;

a picker apparatus including:

a base portion that is immovable;

a robot arm coupled to the base portion to removably engage with items to be picked;

a vacuum cup coupled to the robot arm, to removably engage with items to be picked;

a vacuum pump coupled to the vacuum cup, to apply a suction force via the vacuum cup to items to be picked; and a pressure meter coupled to the vacuum cup, to detect a pressure within the vacuum cup; and a server communicably coupled to the set of runner apparatuses and to the picker apparatus, the server configured to:

receive a specification of the order including the set of items;

generate a set of commands for fulfillment of the order;

for each item of the set of items:

select a runner apparatus from the set of runner apparatuses as a first runner apparatus;

transmit, to the first runner apparatus, a first command to retrieve a first box of the set of boxes for presentation to the picker apparatus, the first box having disposed therein a set of identical instances of that item; and transmit, to the picker apparatus, a second command to sort that item from the first box to a destination box, wherein the first runner apparatus is configured to:

retrieve by the first runner apparatus and subject to the first command, the first box by:

moving to a location proximate to the first box;

via the lift of the first runner apparatus, moving the platform of the first runner apparatus to the same height as the first box; and drawing the first box off its associated shelf of the set of shelves and onto the platform; and present the first box to the picker apparatus by:

moving to a location proximate to the picker apparatus; and via the lift of the first runner apparatus, moving the platform holding the first box to a predetermined height for access by the picker apparatus, wherein the picker apparatus is configured to:

pick, subject to the second command, that item by:

imaging at least a portion of an interior of the first box to identify and select an instance of that item from the set of items as a selected item;

identifying a pick point of the selected item; and via the robot arm of the picker apparatus, engaging with the identified pick point of the selected item to pick the selected item out of the first box; and move the selected item to the destination box by:

translocating the robot arm holding the selected item along a predetermined trajectory towards the destination box; and releasing the selected item into the destination box.

11. The system of claim 10, wherein the picker apparatus further includes an imaging device, and wherein the picker apparatus is further configured to image the portion of the interior of the first box to identify at least some of the set of items by:

acquiring image and/or video data of the portion of the interior of the first box with the imaging device of the picker apparatus; and applying a convolutional neural network to the image and/or video data to identify the at least some of the set of items.

12. The system of claim 10, wherein the picker processor is further configured to identify the pick point by:

identifying a set of pick points on the selected item; and selecting, a first pick point of the set of pick points as the identified pick point.

13. The system of claim 10, wherein the picker apparatus is further configured to pick that item by:

generating, in a randomized manner, a spatial trajectory for movement of the robot arm taken to pick that item as the selected item and to move the selected item to the destination box;

analyzing that spatial trajectory to identify any collisions of the robot arm with its environment;

if no collisions are identified, deeming that spatial trajectory as the predetermined trajectory; and if a collision is identified, repeating said generating and analyzing steps.

14. The system of claim 13, wherein the picker apparatus is further configured to generate the spatial trajectory by generating a polyhedral representation of the robot arm and of its environment, and wherein the picker apparatus is further configured to analyze the spatial trajectory by identifying a collision between the robot arm and its environment when the polyhedral representation of the robot arm spatially overlaps with the polyhedral representation of its environment at any point on that trajectory.

15. The system of claim 10, wherein the picker apparatus is further configured to transmit an indication of the pressure within the vacuum cup to the server, and wherein the server is further configured determine that the selected item has been picked from the first box by the robot arm.

16. The system of claim 10, wherein the picker apparatus further includes a flow meter coupled to the vacuum cup, to detect a flow rate within the vacuum cup, wherein the picker apparatus is further configured to, when the ratio of the detected pressure to the detected flow rate exceeds a predetermined threshold, transmit an indication that the selected item has been picked from the first box by the robot arm.

17. The system of claim 10, wherein the first runner apparatus further includes one or more suction cups for engaging with a box to be manipulated, and wherein the first runner apparatus is configured to draw the first box onto the platform by:

coupling the one or more suction cups with the first box via a suction force applied to the one or more suction cups; and moving the one or more suction cups across the platform to pull the first box coupled thereto onto the platform.

18. The system of claim 10, wherein each runner apparatus of the set of runner apparatuses includes a set of motion sensors to monitor change in position of that runner apparatus, wherein each runner apparatus of the set of runner apparatuses is further configured to:

maintain and/or update a spatial map of their surroundings using simultaneous localization and mapping (SLAM); and based on its set of motion sensors, determine its location in real-time on the spatial map, and wherein the first runner apparatus is further configured to move to a location proximate to the picker apparatus based on its corresponding spatial map and continuous monitoring of its corresponding set of motion sensors.

19. A method for fulfillment of an order including a set of items disposed in a set of boxes, the boxes being disposed on a set of shelves, the method comprising:

a) receiving, at a master server, a specification of the order including the set of items;

b) generating, at the master server, a set of commands for fulfillment of the order;

for each item of the set of items:

c) selecting a runner apparatus of a set of runner apparatuses as a first runner apparatus;

d) transmitting, by the master server to the first runner apparatus, a first command to retrieve a first box of the set of boxes for presentation to a picker apparatus, the first box having disposed therein a set of identical instances of that item;

e) retrieving, by the first runner apparatus and subject to the first command, the first box by:

moving to a location proximate to the first box;

via a lift of the first runner apparatus, moving a platform of the first runner apparatus to the same height as the first box;

drawing the first box off its associated shelf of the set of shelves and onto the platform;

f) presenting, by the first runner apparatus, the first box to the picker apparatus by:

moving to a location proximate to the picker apparatus, wherein the picker apparatus includes a base portion that is immovable; and via the lift, moving the platform holding the first box to a predetermined height for access by the picker apparatus;

g) transmitting, by the master server the picker apparatus, a second command to sort that item from the first box to a destination box;

h) picking, by the picker apparatus and subject to the second command, that item by:

1) imaging at least a portion of an interior of the first box to identify and select an instance of that item from the set of items as a selected item;

2) identifying a pick point of the selected item;

3) generating, in a randomized manner, a spatial trajectory for movement of the robot arm untaken to pick that item as the selected item and to move the selected item to the destination box;

4) analyzing that spatial trajectory to identify any collisions of the robot arm with its environment;

5) if no collisions are identified at step (4), deeming that spatial trajectory as a predetermined trajectory;

6) if a collision is identified, repeating steps (3)-(6); and 7) via a robot arm of the picker apparatus, engaging with the identified pick point of the selected item to pick the selected item out of the first box; and i) moving, by the picker apparatus, the selected item to the destination box by:

translocating the robot arm holding the selected item along the predetermined trajectory towards the destination box; and releasing the selected item into the destination box.

20. The method of claim 19, step (3) further including generating a polyhedral representation of the robot arm and of its environment, and step (4) further including identifying a collision between the robot arm and its environment when the polyhedral representation of the robot arm spatially overlaps with the polyhedral representation of its environment at any point on that trajectory.

* * * * *